US011444828B2

(12) United States Patent
Prakash et al.

(10) Patent No.: US 11,444,828 B2
(45) Date of Patent: Sep. 13, 2022

(54) IDENTIFYING BORDER GATEWAY PROTOCOL (BGP) ANOMALIES AT SCALE

(71) Applicant: Ciena Corporation, Hanover, MD (US)

(72) Inventors: Anurag Prakash, Kanata (CA); Varneet Johal, Ottawa (CA)

(73) Assignee: Ciena Corporation, Hanover, MD (US)

(*) Notice: Subject to any disclaimer, the term of this patent is extended or adjusted under 35 U.S.C. 154(b) by 214 days.

(21) Appl. No.: 16/788,422

(22) Filed: Feb. 12, 2020

(65) Prior Publication Data
US 2021/0250228 A1    Aug. 12, 2021

(51) Int. Cl.
H04L 41/0654 (2022.01)
H04L 41/0631 (2022.01)
H04L 41/0893 (2022.01)
H04L 41/142 (2022.01)
H04L 45/02 (2022.01)
H04Q 11/00 (2006.01)

(52) U.S. Cl.
CPC ........ H04L 41/0672 (2013.01); H04L 41/065 (2013.01); H04L 41/0893 (2013.01); H04L 41/142 (2013.01); H04L 45/08 (2013.01); H04Q 11/0066 (2013.01); H04Q 2011/0083 (2013.01)

(58) Field of Classification Search
CPC ............... H04L 41/0672; H04L 41/065; H04L 41/0893; H04L 41/142; H04L 45/08; H04Q 11/0066; H04Q 2011/0083
See application file for complete search history.

(56) References Cited

U.S. PATENT DOCUMENTS

| 8,666,247 | B2 | 3/2014 | Srinivasan et al. |
| 8,682,160 | B2 | 3/2014 | Prakash et al. |
| 8,718,471 | B2 | 5/2014 | Prakash et al. |
| 8,818,198 | B2 | 8/2014 | Trnkus et al. |
| 8,854,955 | B2 | 10/2014 | Prakash et al. |
| 9,054,831 | B2 | 6/2015 | Prakash et al. |

(Continued)

FOREIGN PATENT DOCUMENTS

| EP | 2963852 B1 | 6/2015 |
| EP | 3051725 A1 | 1/2016 |

OTHER PUBLICATIONS

Al-Musawi et al., BGP Anomaly Detection Techniques: A Survey, IEEE Communications Surveys & Tutorials, 2016, pp. 1-21.
(Continued)

Primary Examiner — Ajay Cattungal
(74) Attorney, Agent, or Firm — Clements Bernard Baratta; Lawrence A. Baratta, Jr.; Christopher L. Bernard

(57) ABSTRACT

Systems and methods for enhancing the Border Gateway Protocol (BGP) are provided. In one implementation, a computer-readable medium comprises instructions that, when executed, cause a network element to perform the steps of maintaining and tracking states of multiple Border Gateway Protocol (BGP) peers and routes while operating BGP within one or more Autonomous Systems. The instructions further cause the network element to detect one or more anomalies, based on the maintaining and tracking, as a number of the multiple BGP peers and/or routes scale in the one or more Autonomous Systems. Also, the instructions cause the network element to cause the processing of one or more remedial actions based on the one or more detected anomalies.

20 Claims, 13 Drawing Sheets

(56) References Cited

U.S. PATENT DOCUMENTS

| | | |
|---|---|---|
| 9,118,421 B2 | 8/2015 | Swinkels et al. |
| 9,172,658 B2 | 10/2015 | Kakkar et al. |
| 9,236,953 B2 | 1/2016 | Chhillar et al. |
| 9,407,359 B2 | 8/2016 | Swinkels et al. |
| 9,485,550 B2 | 11/2016 | Chhillar et al. |
| 9,485,551 B2 | 11/2016 | Prakash et al. |
| 9,538,264 B2 | 1/2017 | Surek et al. |
| 9,628,172 B2 | 4/2017 | Prakash et al. |
| 9,800,522 B2 | 10/2017 | Chhillar et al. |
| 9,985,724 B2 | 5/2018 | Prakash et al. |
| 10,003,867 B2 | 6/2018 | Prakash et al. |
| 10,038,495 B2 | 7/2018 | Prakash et al. |
| 10,097,306 B1 | 10/2018 | Chhillar et al. |
| 10,110,438 B2 | 10/2018 | Prakash et al. |
| 10,158,448 B2 | 12/2018 | Prakash et al. |
| 10,187,144 B2 | 1/2019 | Prakash et al. |
| 10,187,152 B2 | 1/2019 | Prakash et al. |
| 10,411,806 B2 | 9/2019 | Prakash et al. |
| 10,455,300 B2 | 10/2019 | Swinkels et al. |
| 10,536,216 B1 | 1/2020 | Chhillar et al. |
| 2005/0074003 A1* | 4/2005 | Ball ............ H04L 45/04 370/389 |
| 2013/0051248 A1 | 2/2013 | Pei et al. |
| 2015/0257081 A1* | 9/2015 | Ramanujan ...... H04L 45/24 370/329 |
| 2015/0341431 A1* | 11/2015 | Hartrick ........ H04L 47/125 709/223 |
| 2016/0308762 A1* | 10/2016 | Teng ............ H04L 12/4641 |
| 2016/0337179 A1* | 11/2016 | Rao ............. H04L 41/5025 |
| 2016/0359872 A1* | 12/2016 | Yadav .......... H04L 63/1408 |
| 2017/0279828 A1* | 9/2017 | Savalle ........ H04L 63/1425 |
| 2018/0248905 A1* | 8/2018 | Cote ............ G06F 17/18 |
| 2019/0349262 A1 | 11/2019 | Miedema |
| 2020/0036439 A1 | 1/2020 | Chhillar et al. |
| 2020/0213154 A1* | 7/2020 | Han ............ H04L 47/125 |
| 2020/0213225 A1* | 7/2020 | Han ............ H04L 41/0806 |
| 2021/0112034 A1* | 4/2021 | Sundararajan ... H04L 49/25 |

OTHER PUBLICATIONS

Hiran et al., Characterizing Large-scale Routing Anomalies: A Case Study of the China Telecom Incident, 2013, pp. 1-10.

ETSI Technical Report, "Access, Terminals, Transmission and Multiplexing (ATTM); Integrated Broadband Cable and Television Networks; Cable Network Transition to IPv6," ETSI TR 101 569 V1.1.1, Dec. 2021, pp. 1-123.

Meyer et al., "BGP-4 Protocol Analysis," Internet-Draft, Category Informational, Dec. 2004, pp. 1-19.

ISO/IEC JTC 1/S 27, "Reporton secure routing technologies," ENISA Report, Information technology—Security techniques, Apr. 1, 2011, pp. 1-34.

Jun. 18, 2021, European Search Report for European Patent Application No. EP 21 15 6366.

* cited by examiner

| BGP SCALE-ANOMALIES | FILTERING/TRACING TECHNIQUE | ANALYTICAL APPROACH |
|---|---|---|
| Prolonged Route Update Processing | Event Queue Statistics | Queueing Throughput |
| Repeated Neighbor Route Updates | BGP Neighbor FSM Transitions | Correlation/Clustering |
| Re-announcements for BGP Neighbors | BGP Neighbor FSM Transitions | Correlation/k-means graph |
| BGP Neighbor Session Flaps after Achieving Established State | Event Queue Statistics + BGP Neighbor FSM Transitions + Keep Alive Statistics | Frequency Transform |

FIG. 5

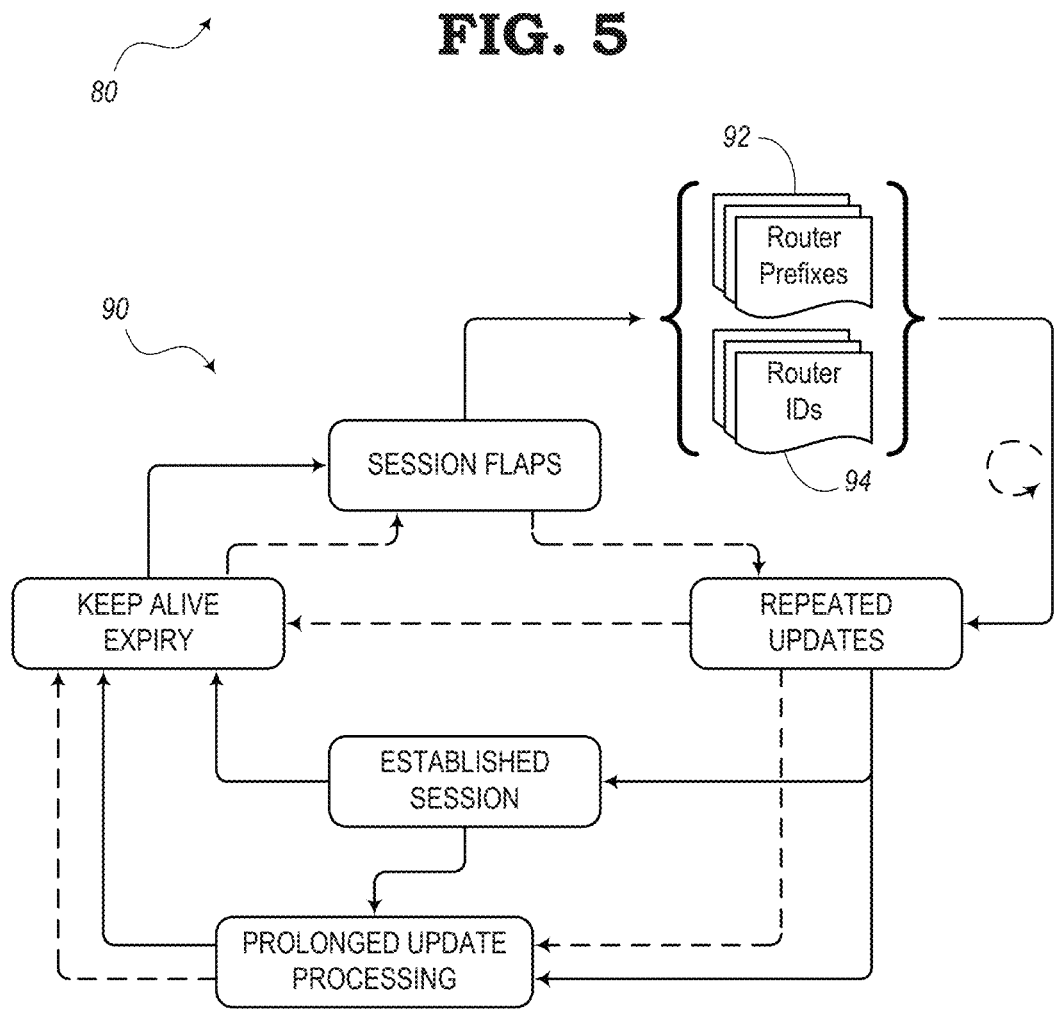

FIG. 6

IDENTIFYING BORDER GATEWAY PROTOCOL (BGP) ANOMALIES AT SCALE

TECHNICAL FIELD

The present disclosure generally relates to networking systems and methods. More particularly, the present disclosure relates to characterizing Border Gateway Protocol (BGP) anomalies that are caused by scaling an Autonomous System and taking remedial actions when such anomalies are detected.

BACKGROUND

The Border Gateway Protocol (BGP) is a known Internet protocol for global connectivity across Autonomous Systems and is often used for inter-domain communication and routing policies for Internet Service Providers (ISPs). BGP maintains and exchanges network reachability information between Autonomous Systems, which may be organized in a hierarchical arrangement. BGP was developed at a time when information provided by an Autonomous System could be assumed to be accurate. Consequently, BGP may include few security mechanisms, leaving BGP vulnerable to different types of events, such as hijacking, misconfiguration, link failure, etc.

BGP is typically used on a somewhat small scale and is able to operate according to design. However, on a larger scale, BGP tends to exhibit undesirable behavior. The scale of BGP Routing Information Base (RIB), along with combinations of traffic engineering and routing policies, leads to a complex structure. BGP is vulnerable to topology changes, route flapping, repeated updates, neighbor management, and even configuration changes in a network. In some cases, these events have threatened Internet performance, reliability, and stability. Instability of BGP can affect performance, processing load, and the distribution balance of traffic load for BGP speakers.

Solutions to the BGP issues may be considered to be ISP-specific. Also, solutions may rely on the operations of a third-party monitoring system, which monitors BGP data and updates. Thus, it is a goal to avoid anomalies with respect to the typical configuration issues of a BGP system and the vulnerability of the BGP system to hackers. However, in addition to configuration and hacking anomalies, other types of anomalies have been detected that may be related to the scaling BGP beyond a certain size. Typically, a network designer may attempt to prevent scaling an Autonomous System beyond this certain size altogether, thus ignoring the issues that may arise as a result of massive scaling.

Network Management Systems (NMSs) may be integrated into an Autonomous System to characterize BGP and to provide real-time information about the Autonomous System. The NMS may be third party device. Sourcing labelled data from a third-party software stack for characterization can be a problem, since permissions may not necessarily be given to legally expose the data on the system. Also, since anomalies based on scale are normally avoided altogether by simply not scaling an Autonomous System beyond a certain size, conventional systems are not configured to detect issues that arise as a result of massive scaling. Third-party solutions cannot detect anomalies as a result of scaling, due in part to the data collection and analysis performed "on the box" (i.e., in the network element). Conventional systems can only detect what is seen on the wire. Even with detection, however, the conventional systems are not further configured to take any actions to the remedy the scale-related anomalies.

Therefore, there is a need in the field of networking using BGP to allow a network element to be scaled in an Autonomous System beyond what conventional systems normally allow. Also, there is a need to detect anomalies related to the scaling of the network and take remedial actions to enable the network element to continue operation in such a large scale network with fewer anomalies.

BRIEF SUMMARY

The present disclosure is directed to networking systems and methods for enabling a network element to be scaled without suffering from scale-based anomalies that may usually be accompanied with such scaling. In one embodiment, a non-transitory computer readable medium comprises instructions that, when executed, cause a network element to perform a step of maintaining and tracking states of multiple Border Gateway Protocol (BGP) peers and routes while operating BGP within one or more Autonomous Systems. The instructions further cause the network element to detect one or more anomalies, based on the maintaining and tracking, as a number of the multiple BGP peers and/or routes scale in the Autonomous System. Also, the instructions cause the network element to cause processing of one or more remedial actions based on the one or more detected anomalies.

According to another embodiment, a networking system comprising a network element configured to maintain and track states of multiple Border Gateway Protocol (BGP) peers and routes while operating BGP within one or more Autonomous Systems. The network element is further configured to detect one or more anomalies, based on the maintaining and tracking, as a number of the multiple BGP peers and/or routes scale in the Autonomous System. The network element is further configured to cause processing of one or more remedial actions based on the one or more detected anomalies.

According to yet another embodiment, a server is configured to maintain and track states of multiple Border Gateway Protocol (BGP) peers and routes while operating BGP within one or more Autonomous Systems. The server is further configured to detect one or more anomalies, based on the maintaining and tracking, as a number of the multiple BGP peers and/or routes scale in the Autonomous System. Also, the server is configured to cause processing of one or more remedial actions based on the one or more detected anomalies.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 5 is a table illustrating the parameterization of scale anomalies, according to various embodiments.

FIG. 6 is a flow chart illustrating potential feedback loops in the processing of router prefixes and IDs, according to various embodiments.

DETAILED DESCRIPTION

Figure 1:
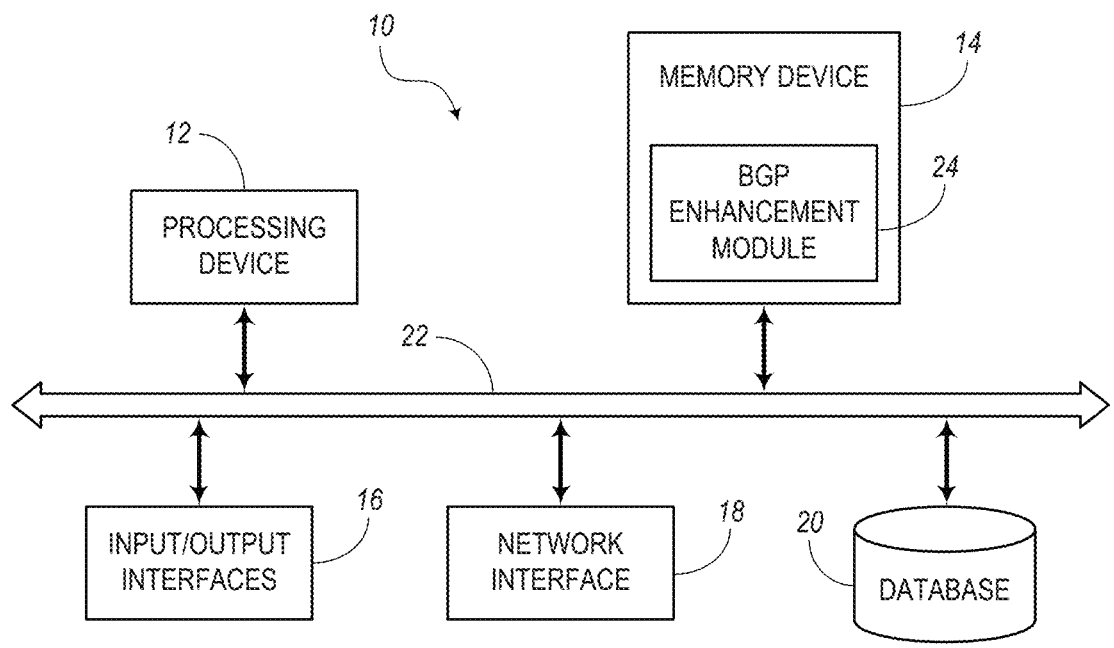
FIG. 1 is a block diagram illustrating a computer system for handling Border Gateway Protocol (BGP) anomalies, according to various embodiments of the present disclosure.

In some situations, it may be beneficial to scale a network element (e.g., router, switch, or other network device) to enable the network element to communicate with a large number of peers. However, when operating with the Border Gateway Protocol (BGP), scaling to a large extent can cause issues that may be similar to vulnerabilities of the BGP protocol. Instead of averting the opportunity to create a larger scale system, which would avoid the scale-related issues, the systems and methods of the present disclosure are configured to enable a large scale while also addressing the issues that may arise as a result of massive scaling in a BGP system. With the larger scale, the systems can thereby provide greater service.

As described herein, the term "scale" denotes growth of a network, network device, network element, router, switch, etc. to a larger size. Also, as described herein, BGP has been deployed on a smaller scale to date, due to the aforementioned issues. While these terms are relative, those of ordinary skill in the art appreciate the aforementioned issues when BGP scales in size. For example, a "small scale" may be defined as having about 100 BGP sessions with about 10 k-16 k BGP routes, and a "large scale" may be defined as having about 500 or more BGP sessions with about 500 k or more BGP routes. At a large scale, it may be possible to scale the BGP protocol to 540 or more BGP neighbors or peers along with 30,000 or more routes on a single network element. The BGP protocol normally works efficiently at a lower scale than the example large scale. However, at the large scale, the system may turn into a multi-dimensional problem and exhibit anomalous patterns similar to the ones that may be detected with respect to protocol vulnerability anomalies. These issues, for instance, may be the result of repeated updates, session flapping, route flapping, topology convergence delays, black-holes in the traffic, etc. Again, these symptoms are similar to what may be observed in a network due to protocol vulnerability. The anomalies or issues that arise as a result of scaling beyond a normal range may be referred to as "scale anomalies" or "scale-related anomalies."

The relationship between the issues related to scaling beyond a certain size and the BGP protocol vulnerability anomalies are recognized in the present disclosure. This correlation, and hence the term "scale anomalies," leads to an approach where the scaling problem is treated in the present disclosure as anomaly detection rather than a configuration issue. A framework can be built that detects such scale anomalies and can trace the behavior of the system or Autonomous System (AS) during those times of massive scaling. By detecting the scale anomalies, it may be possible to trace the issues back to a root cause and perform various remedial actions to enable the system to continue operating at the large scale.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram showing an embodiment of a scale control device 10 for handling BGP scale anomalies within a network or Autonomous System. The scale control device 10 may be a Network Monitoring System (NMS) that may be configured to handle BGP scale anomalies in one or more Autonomous Systems. In some cases, the NMS may be a third-party device and may be incorporated separate from a network or Autonomous System being monitored. In some embodiments, the scale control device 10 may represent a network element incorporated in an Autonomous System, whereby a separate monitoring device may be used to enable the network element to operate within the Autonomous System at large scale while also handling scale anomalies that may arise as a result of the network element operating at the larger scale. The network element may be able to self-adapt to scale to allow the network element to continue operating in a normal way even when scaled beyond what many systems may normally be able to handle. In other embodiments, the scale control device 10 may be a central controller for handling scale-related of one or more network elements in a network.

In the illustrated embodiment, the scale control device 10 may be a digital computer that, in terms of hardware architecture, generally includes a processing device 12, a memory device 14, input/output (I/O) interfaces 16, a network interface 18, and a database 20. The memory device 14 may include a data store, database, or the like. It should be appreciated by those of ordinary skill in the art that FIG. 1 depicts the scale control device 10 in a simplified manner, where practical embodiments may include additional components and suitably configured processing logic to support known or conventional operating features that are not described in detail herein. The components (i.e., 12, 14, 16, 18, 20) are communicatively coupled via a local interface 22. The local interface 22 may be, for example, but not limited to, one or more buses or other wired or wireless connections. The local interface 22 may have additional elements, which are omitted for simplicity, such as controllers, buffers, caches, drivers, repeaters, receivers, among other elements, to enable communications. Further, the local interface 22 may include address, control, and/or data connections to enable appropriate communications among the components 12, 14, 16, 18, 20.

The processing device 12 is a hardware device adapted for at least executing software instructions. The processing device 12 may be any custom made or commercially available processor, a central processing unit (CPU), an auxiliary processor among several processors associated with the scale control device 10, a semiconductor-based microprocessor (in the form of a microchip or chip set), or generally any device for executing software instructions. When the scale control device 10 is in operation, the processing device 12 may be configured to execute software stored within the memory device 14, to communicate data to and from the memory device 14, and to generally control operations of the scale control device 10 pursuant to the software instructions.

It will be appreciated that some embodiments of the processing device 12 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 12 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 16 may be used to receive user input from and/or for providing system output to one or more devices or components. User input may be provided via, for example, a keyboard, touchpad, a mouse, and/or other input receiving devices. The system output may be provided via a display device, monitor, graphical user interface (GUI), a printer, and/or other user output devices. I/O interfaces 16 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The network interface 18 may be used to enable the scale control device 10 to communicate over a network, such as a telecommunications network, the Internet, a wide area network (WAN), a local area network (LAN), and the like. The network interface 18 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 18 may include address, control, and/or data connections to enable appropriate communications on the telecommunications network.

The memory device 14 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 14 may incorporate electronic, magnetic, optical, and/or other types of storage media. The memory device 14 may have a distributed architecture, where various components are situated remotely from one another, but can be accessed by the processing device 12. The software in memory device 14 may include one or more software programs, each of which may include an ordered listing of executable instructions for implementing logical functions. The software in the memory device 14 may also include a suitable operating system (O/S) and one or more computer programs. The operating system (O/S) essentially controls the execution of other computer programs, and provides scheduling, input-output control, file and data management, memory management, and communication control and related services. The computer programs may be configured to implement the various processes, algorithms, methods, techniques, etc. described herein.

The memory device 14 may include a data store used to store data. In one example, the data store may be located internal to the scale control device 10 and may include, for example, an internal hard drive connected to the local interface 22 in the scale control device 10. Additionally, in another embodiment, the data store may be located external to the scale control device 10 and may include, for example, an external hard drive connected to the I/O interfaces 16 (e.g., SCSI or USB connection). In a further embodiment, the data store may be connected to the scale control device 10 through a network and may include, for example, a network attached file server.

Moreover, some embodiments may include a non-transitory computer-readable storage medium having computer readable code stored in the memory device 14 for programming the scale control device 10 or other processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 12 that, in response to such execution, cause the processing device 12 to perform a set of operations, steps, methods, processes, algorithms, functions, techniques, etc. as described herein for the various embodiments.

In some embodiments, the memory device 14 may include various computer programs for performing various functions or services. For example, the memory device 14 may include a BGP enhancement module 24 for enabling the processing device 12 to perform many of the functions described in the present disclosure with respect to enabling a network element to operate under the BGP protocol within one or more Autonomous Systems, whereby the network element can be scaled in such a way that a system may experience scale anomalies. The BGP enhancement module 24 may therefore be configured to process any issues that may arise as a result of scaling a network element beyond what a typical network element may normally be scaled.

However, the BGP enhancement module 24 may be configured to enhance BGP by providing certain functions that can work around the scale issues to allow the network element to operate at scale (i.e., beyond a scale threshold). For example, the BGP enhancement module 24 may be configured to characterize the BGP protocol by parameterizing the protocol, monitoring/tracing features of the system, gathering data related to queueing, BGP peer updates, etc., and analyzing the data using one or more specific approach to determine certain characteristics of the scale anomalies or scale-related issues. With this knowledge, the BGP enhancement module 24 can then cause the processing device 12 to perform actions to remedy any issues that are caused by scaling to a point where issues may start to arise. By correcting the issue, the BGP enhancement module 24 overcome some inherit issues with the protocol and allow a system to scale to any size without the negative consequences usually experienced when scaled without the assistance of the BGP enhancement module 24 described in the present disclosure.

Figure 2:
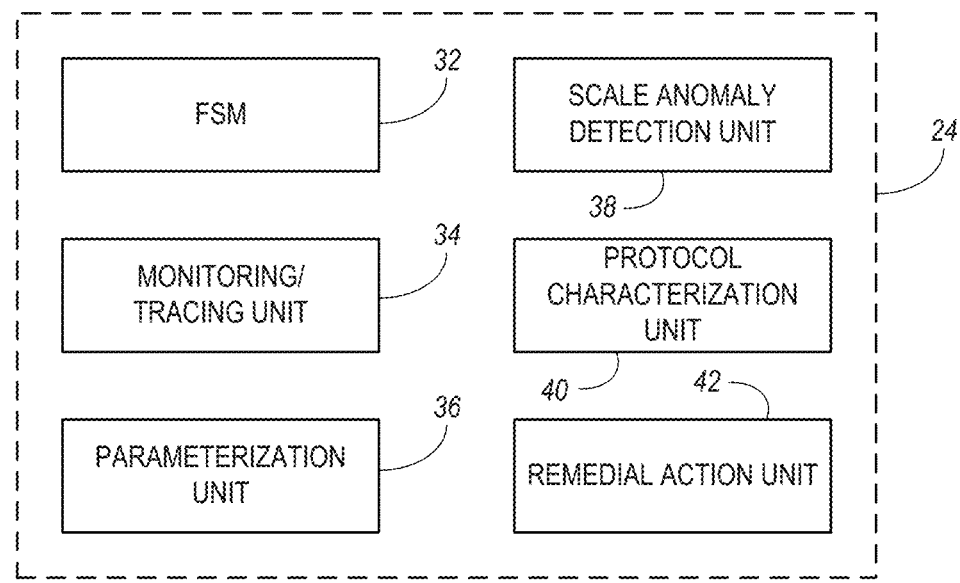
FIG. 2 is a block diagram illustrating a BGP enhancement module shown in FIG. 1, according to various embodiments of the present disclosure.

FIG. 2 is a block diagram showing an embodiment of the BGP enhancement module 24 shown in FIG. 1. In this embodiment, the BGP enhancement module 24 may be configured as Software Defined Networking (SDN) instructions. The BGP enhancement module 24, according to various embodiments, may include one or more of a Finite State Machine (FSM) 32, a monitoring/tracing unit 34, a parameterization unit 36, a scale anomaly detection unit 38, a protocol characterization unit 40, and a remedial action unit 42.

The FSM 32 may be configured to operate according to BGP protocol for monitoring the various states of the scale control device 10 of FIG. 1 or other network element of interest. The FSM 32 is also configured to receive information, via the network interface 18, about the states of neighboring network elements. In some embodiments, the network element may operate without an intervening operating system.

The monitoring/tracing unit 34 may be configured for monitoring, detecting, tracing, or sensing various parameters or conditions of the scale control device 10 or other network element of interest. For example, the monitoring/tracing unit 34 may be configured to detect data or receive sensor data regarding events, sessions, FSM transitions and states, queue statistics, etc. This detected or received data may be relevant to the scale control device 10 itself and/or from one or more neighbors or peers.

The parameterization unit 36 is configured to parameterize the data gathered by the monitoring/tracing unit 34 to represent the data in terms of how the data is related scale anomalies. The table of FIG. 5 shows how the scale anomaly parameterization of various issues are defined, what various techniques are used by the monitoring/tracing unit 34 to gather the pertinent data to determine the parameterized scale anomaly variables, and what type of analytical approach is taken to utilize the gathered data in order to provide a parameterized value for each of the various scale anomaly variables.

The scale anomaly detection unit 38 is configured to take the data that is relevant to scale anomaly detection and use various analytical approaches to process the data to calculate the scale anomaly variables. The scale anomaly detection unit 38 may utilize specific analytical approaches as laid out in the third column of the table of FIG. 5. For example, the scale anomaly detection unit 38 may use queueing throughput analysis, correlation analysis, clustering analysis, k-means analysis, frequency transform analysis, and/or other various statistical analysis approaches to process the data in order to obtain values that are indicative of various issues related to scale anomalies when the network is scaled beyond a small-scale network having an easily manageable number of peers. Thus, as peers are added to a network, the network can utilize the BGP enhancement module 24 described in the present disclosure to self-adapt to the changing network to scale.

The protocol characterization unit 40 may be configured to characterize the BGP protocol or other routing or forwarding protocols. The protocol characterize unit 40 may be configured to obtain information about the nature of the protocol to determine the issues that may arise if a network operating under that protocol were to experience a scaling to extent that may put the network in a condition where infinite feedback loops, black-hole processing, etc. may result. By characterizing the various pitfalls of a protocol, the protocol characterization unit 40 may allow a network operator to devise a plan to overcome these pitfalls by determining how the network can operate when it is scaled from a smaller, manageable scale to a larger, not-easily-manageable scale. However, by utilizing the BGP enhancement module 24 of the present disclosure, a network operator can determine what information that is related to scale anomalies, ways to gather this information, and ways to analyze this information to determine scale anomaly variables that are parameterized to indicate when one or more scale anomalies occur.

The remedial action unit 42 is configured to receive information about any scale anomaly variables that exceed certain thresholds (which can be referred to as a scale threshold), which may be indicative of an issue related to scaling the network to a point where issue may arise. When these thresholds are reached, the remedial action unit 42 is configured to cause the processing device 12 to perform certain actions that will alleviate or fix the scale issues. Some actions may include clustering a number of peers that can be represented by a dominant peer (e.g., dominant router). The dominant peer/router is a BGP neighbor in the network which is either causing a lot of session flaps due to any of its internal issues (either comms/software, etc.) or a BGP neighbor which is repeatedly sending updates to add and withdraw routes at a rapid cadence for prolonged periods indicative of an anomaly from normal behavior. In this case, the computer device 10 only receives neighbor updates from the dominant peer and not the entire cluster, thus reducing the number of FSM transition messages from these other devices. Other actions such as dampening, de-bouncing, discarding, back-pressuring, and clustering can be used by the remedial action unit 42 to prevent session flapping and other issues that may cause excessive information to be dumped into processing queues of the computer device 10.

Some of the remedial actions that may be taken include a) de-bouncing, b) dampening, c) discarding, d) back-pressuring, and e) clustering. For example, "de-bouncing" may be specific to quick TCP session/underlying communication layer flaps. The remedial action unit 42 may be configured to debounce the flaps and act on a final state after a period of activity, instead of acting on each session flap in the protocol layer, which may avoid a scale bottleneck in case of high availability architecture. "Dampening" may be a technique where quick network flaps and updates are processed only after a soak period expires. This may be performed to avoid ringing effects in update processing and flooding, which may eventually lead to some kind of lazy flooding. The "discarding" action may include dropping updates from a particular neighbor that may be identified as anomalously flapping its sessions so that the network is not impacted. This may be based on an anomaly detection. The "back-pressuring" action may include reducing the rate of (incoming update processing)+(flooding) incoming updates. "Clustering" may include the identification of routers or route prefixes that may be detected as being anomalous (session flaps/repeated frequent changes) as a cluster to which any of the above-mentioned actions (a-d) can be applied.

Figure 3:
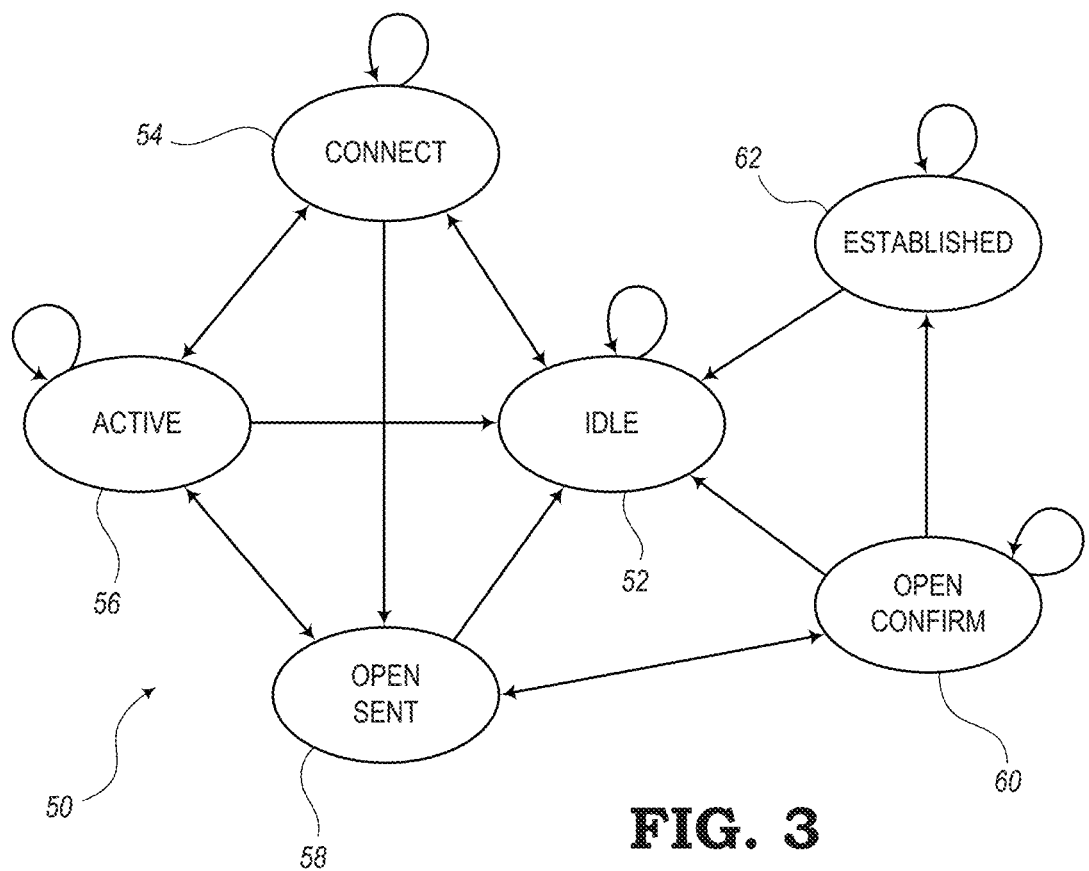
FIG. 3 is a schematic diagram illustrating a Finite State Machine (FSM) shown in FIG. 2, according to various embodiments.

FIG. 3 is a schematic diagram illustrating a Finite State Machine (FSM) 50, which may represent the FSM 32 shown in FIG. 2. The FSM 50 may be part of the BGP protocol for analyzing states and informing neighboring devices of these states. The problem that arises with a BGP network is that, if the BGP network is scaled to a large extent, a network element (e.g., router) may have a large number of peers. For example, if a network element has hundreds of peers, it will receive a large amount of data, based on the FSM of the BGP protocol, from each of these peers, which, in many cases, can overload the processing queues of the network element. An explanation of the FSM 50 is described herein.

The FSM 50 includes an "idle" element 52, a "connect" element 54, an "active" element 56, an "open sent" element 58, an "open confirm" element 60, and an "established" element 62. During a handshaking process, "open" messages may be exchanged between BGP peers. One peer can negotiate optional capabilities of a session, including multi-protocol extensions and various recovery modes. In order to make decisions about the various operations with its peers, a BGP peer may use the FSM 50. Each of the elements 52, 54, 56, 58, 60, 62 of the FSM 50 represents the six states of the session between two peer devices. The states can include Idle, Connect, Active, OpenSent, OpenConfirm, and Established.

For each session between peers, the FSM 50 maintains a state variable that tracks the current session state. BGP also defines the messages that each peer exchanges in order to change the session from one state to another. In the "Idle" state, the idle element 52 initializes all resources, rejects all other inbound BGP connection attempts, and initiates a connection with the peer. In the "Connect" state, the device waits for the connection to complete and transitions to the "OpenSent" state if it is successful. If not, the FSM 50 may attempt to retry the connection and transitions to the "Active" state. In the "Active" state, the FSM 50 may reset a retry timer and return to the "Connect" state.

In the "OpenSent" state, the FSM 50 sends an "open" message to its peer and waits for a response. If a response is received, the FSM 50 transitions to the "OpenConfirm" state. The FSM 50 is further configured to send a "KeepAlive" message with its peer. Upon successful receipt of KeepAlive response from the peer, the FSM 50 transitions the network element to the "Established" state. In the "Established" state, the network element can send and/or receive KeepAlive message to keep the connection alive, Update messages, and Notification messages to/from its peer.

When any issue arises in the FSM 50, the FSM 50 terminates the BGP session and transitions back to the "Idle" state. At this point, the cycle starts again from the beginning. The FSM 50 may be transitioned to the Idle state or remain in the Idle state for various reasons, such as if a TCP port 179 is not open, if a random TCP port over 1023 is not open, if a peer address is configured incorrectly on either peer, if an AS number is configured incorrectly on either peer.

The idle element 52 is configured to refuse incoming BGP request from other peers, initialize event triggers, initiate a connection with its BGP peer, wait for a connection replay from the BGP peer, and transition the state to "Connect" when applicable. The connect element 54 is configured to wait for successful TCP negotiation with its peer, send Open messages to its peer and changes state to OpenSent. If an error occurs in the OpenSent state and the network element is unable to establish a successful TCP session, the FSM 50 transitions to the Active state. The FSM 50 tries to restart another TCP session with the peer. If successful, the FSM 50 transitions to the OpenSent state and an Open message is sent to the peer. However, if it is unsuccessful, the FSM 50 resets and transitions back to the Idle state.

Repeated failures in FSM 50 may result in a network element cycling between the Idle and Active states. These failures may be the result of the TCP port 179 not being open, a random TCP port over 1023 not being open, a BGP configuration error, network congestion, network interface flapping, etc. To reiterate, when a network is developed where a network element includes multiple peers (e.g., hundreds of peers), the activities of the FSM 50 can overpower the network element. However, with the use of the BGP enhancement module 24 shown in FIGS. 1 and 2, some of these neighbor FSM transition activities can be handled to reduce the impact that the massive amount of peer connection information can have on the network element.

In the OpenSent state, the FSM 50 listens for an Open message from its peer. Once the message has been received, the network element checks the validity of the Open message. If there is an error (e.g., a mismatch in a field in the Open message, a BGP version mismatch, a mismatch in the AS number, etc.), the network element may send a Notification message to the peer indicating why the error occurred. If there is no error, a KeepAlive message is sent to its peer and the FSM 50 transitions to the OpenConfirm state.

In the OpenConfirm state, the network element listens for a corresponding KeepAlive message from its peer. If a KeepAlive message is received within a certain amount of time, The FSM 50 transitions to the Established state. If a KeepAlive timer expires before a Keepalive message is received or if any other type of error occurs, the FSM 50 transitions back to the Idle state. In the Established State, the peers send Update messages to each other to exchange information about routes being advertised. If there is any error in the Update message, then a Notification message is sent to the peer and the FSM 50 transitions back to the Idle state.

Figure 4:
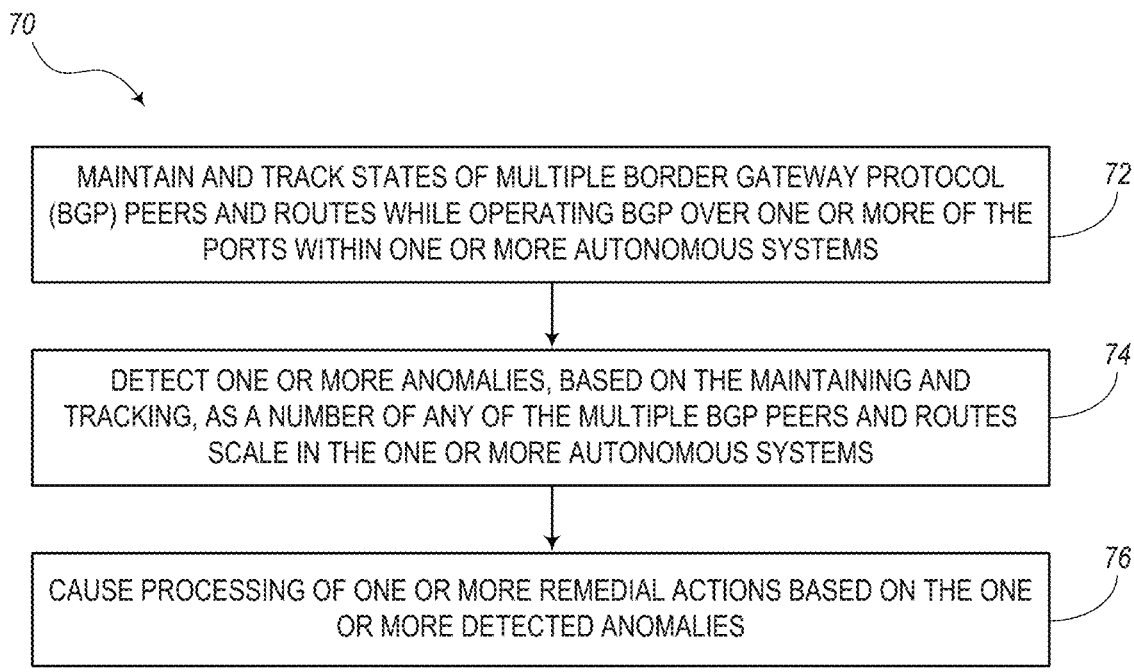
FIG. 4 is a flow diagram illustrating a method for enabling a network element to operate in an Autonomous System (AS) at scale, according to various embodiments of the present disclosure.

FIG. 4 is a flow diagram showing an embodiment of a method 70 for enabling a network device or network element to operate in an Autonomous System (AS) or multiple Autonomous Systems at scale. In this embodiment, the method 70 includes the step (block 72) of maintaining and tracking states of multiple Border Gateway Protocol (BGP) peers and routes while operating BGP within one or more Autonomous Systems. The method 70 also includes the step (block 74) of detecting one or more anomalies, based on the maintaining and tracking, as a number of the BGP peers and/or routes scale in the one or more Autonomous Systems.

The method 70 further includes the step (block 76) of causing the processing of one or more remedial actions based on the one or more detected anomalies. As such, the method 70 may enable a network element to self-adapt based on the scale of the one or more Autonomous Systems and the number of BGP peers.

Those skilled in the pertinent art will appreciate that various embodiments may be described in terms of logical blocks, modules, circuits, algorithms, steps, and sequences of actions, which may be performed or otherwise controlled with a general purpose processor, a DSP, an application specific integrated circuit (ASIC), a field programmable gate array, programmable logic devices, discrete gates, transistor logic, discrete hardware components, elements associated with a computing device, or any suitable combination thereof designed to perform or otherwise control the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments described in the present disclosure may be implemented as electronic hardware, computer software, or any suitable combinations thereof. To clearly illustrate this interchangeability of hardware and software, various illustrative components, blocks, modules, circuits, algorithms, and steps have been described herein in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 5 shows a table 80 of the parameterization of various scale anomalies. A list of BGP scale anomalies is shown in table 80, including, among other possible variables, a "prolonged route update processing" variable, a "repeated neighbor route updates" variable, a "re-announcements for BGP neighbors" variable, and a "BGP neighbor session flaps after achieving established state" variable. These variables can be used to characterize a network with respect to issues that may arise when the network is scaled to a large extent. The variables can be determined by gathering specific information and/or by detecting various patterns in the data, where the data and/or patterns are listed in the "filtering/tracing technique" column (i.e., the second column of the table 80). During processing, the information from the second column is processed using the analytical approach described in the third column of the table 80. The results of the various analytical approaches are used to obtain the variables in the first column of the table 80.

Data patterns listed in the second column may be linked with issues and approaches used for parameterizing the scale anomalies. Conventional systems do not gather the information, label the information, and analyze the information as described with respect to the present disclosure.

The systems and methods of the present disclosure are configured to parameterize or define the various features of different scale anomalies and provide approaches or associated techniques to detect data that may be relevant to the analysis of scale anomalies. Once the scale anomaly analysis is processed, the embodiments of the present disclosure may be configured to trigger various action in response to the analysis.

Scale anomalies in the BGP protocol may be defined, according to one embodiment, as provided in table 80. When one or more of the scale anomaly variables of the first column reach a specific range that is predetermined to potentially be or currently is an issue with the network based on the scale of the network, certain consequences may result. For example, an undesirable positive feedback loop may be created at scale. This may lead to a Routing Information Base (RIB), a routing table, a Forwarding Information Base (FIB), a forwarding table, or other form of routing or forwarding data to never converge or to have a delayed or prolonged convergence.

The BGP enhancement module 24 of the present disclosure may be configured to identify and parameterize scale anomalies in the BGP protocol according to the operating principles described below. The effectiveness of any of the scale anomalies described herein depends on the parameterization of relevant information about the network and the location within the network where the information is obtained.

One technique for operating the BGP enhancement module 24 within a network element may be based on the parameterization of events within the network element itself, CPU utilization within the network element, traffic scheduling, FSM characterization, and other factors that a network operator may recognize. The enhancement of the BGP protocol to handle the scaling of a network element within a network may be performed on the network element itself or remotely by a peer device or a third party device.

Another technique for scale anomaly parameterization may include an in-house developed fast and reliable low latency bare-metal real-time tracing process. The embodiments of the present disclosure may also be configured for data labelling and database upload processes. In some embodiments, the I/O interfaces 16 of the computer device 10 of FIG. 1 may include a display device, such as an automatic dashboard that creates graphs or other display elements for characterization based on real-time collected data for post-incidence-analysis from the field.

FIG. 6 is a flowchart 90 illustrating potential feedback loops in the processing of router prefixes and IDs, according to various embodiments. The flowchart 90 shows how scale anomalies may lead to a positive feedback loop in a system. The paths of the feedback loops are shown in FIG. 6 as dashed lines. The solid lines indicate normal flow. As such, the scale anomalies may not allow the system to converge in a timely manner or may not allow the system to converge ever. The following describes some parameterization processes that can be used for detection:

Prolonged Route Update Processing

Prolonged route update processing may be used to parameterize queuing throughput. A prolonged route update processing anomaly may occur when the BGP processing engine consumes more than expected time in processing a BGP update received from a BGP neighbor. This anomaly can single-handedly destabilize the system, especially on single-threaded protocol stacks. Because of this, the processing engine spends extra time in decoding the update and then additional time is spend on queue processing. During experimentation, it was observed that this issue, if left undetected or unresolved, will bring down queue throughput and slowdown the system drastically. Therefore, the systems and methods of the present disclosure are configured to detect this issue as soon as it starts occurring. "Event queue statistics" may be used as a filtering/tracing technique and "queuing throughput" may be used as an analytical approach.

Repeated Neighbor Route Updates

Repeated neighbor route updates may be used to parameterize router prefixes 92 and Route IDs 94. "Repeated neighbor route updates" anomalies may occur when the BGP engine/daemon is receiving the exact same BGP update for more than once. This can very easily overload the system and build up the receiving queues. Repeated route updates are not going to contribute anything to the FIB/RIB or the BGP routing table, but it is going to overload the system as the processing engine has to spend additional time in decoding the update followed by queuing process and this processing is going to take additional CPU cycles. During experimentation, it was observed that this issue, if left undetected or unresolved, will bring down queue throughput and slowdown the system drastically. Therefore, the systems and methods of the present disclosure are configured to detect this issue as soon as it starts occurring. The BGP enhancement module 24 may use "BGP Neighbor FSM transitions" as a filtering/tracing technique and may use "Correlation/Clustering" as an analytical approach.

Re-Announcements for BGP Neighbors

Analysis of re-announcements for BGP neighbors may be used to parameterize the router prefixes 92 and router IDs 94. When the FSM 50 reaches the Established 62 state from the Open Confirm 60 state, the BGP protocol typically announces all the prefixes relevant to the neighbor from the database. These prefixes/routes are exchanged via update messages. A network prefix is an aggregation of IP addresses. If the neighbor is periodically falling back to Idle 52 state, then the re-announcement of existing prefixes in database is a big overhead as multiple update messages might be required to fulfil the job. During experimentation, it was observed that when this situation occurs, the protocol becomes unstable and eventually destabilizes the other neighbors as well. The BGP enhancement module 24 may use "BGP Neighbor FSM transitions" as a filtering/tracing technique and may use "Correlation/K-means graph" as an analytical approach.

BGP Neighbor Session Flapping after Achieving Established State

Analysis of BGP neighbor session flapping after the FSM 50 has achieved the Established 62 state may be used to parameterize routers and their unique router prefixes 92. BGP Neighbor session flapping after achieving the established state can occur due to several reasons, such as KeepAlive expiry, a notification indicating an error condition to a BGP neighbor, etc. Unexpected neighbor flapping is considered a very severe case in the world of BGP, because the protocol state comes to square one scenario and the protocol engine starts from the very initial state (i.e., Idle 52), which means that all prefixes 92 must be send again to the BGP neighbor. This situation can be very challenging in the scaled environment when the system is already busy maintaining other neighbors. During experimentation, it has been observed that when this situation occurs in scaled environment, the system gets destabilized and tends to experience very high CPU utilization during this time. It has also been observed that this situation may start a chain reaction once a few neighbors fall to this issue. It may take a long time for a system to recover from this situation. Therefore, the systems and methods of the present disclosure are configured to detect this issue. The BGP enhancement module 24 may use "Event Queue Statistics," "BGP Neighbor FSM transitions," and "KeepAlive statistics" as a filtering/tracing technique for this scale anomaly and may use "frequency transform" processing as an analytical approach.

Figure 7A:
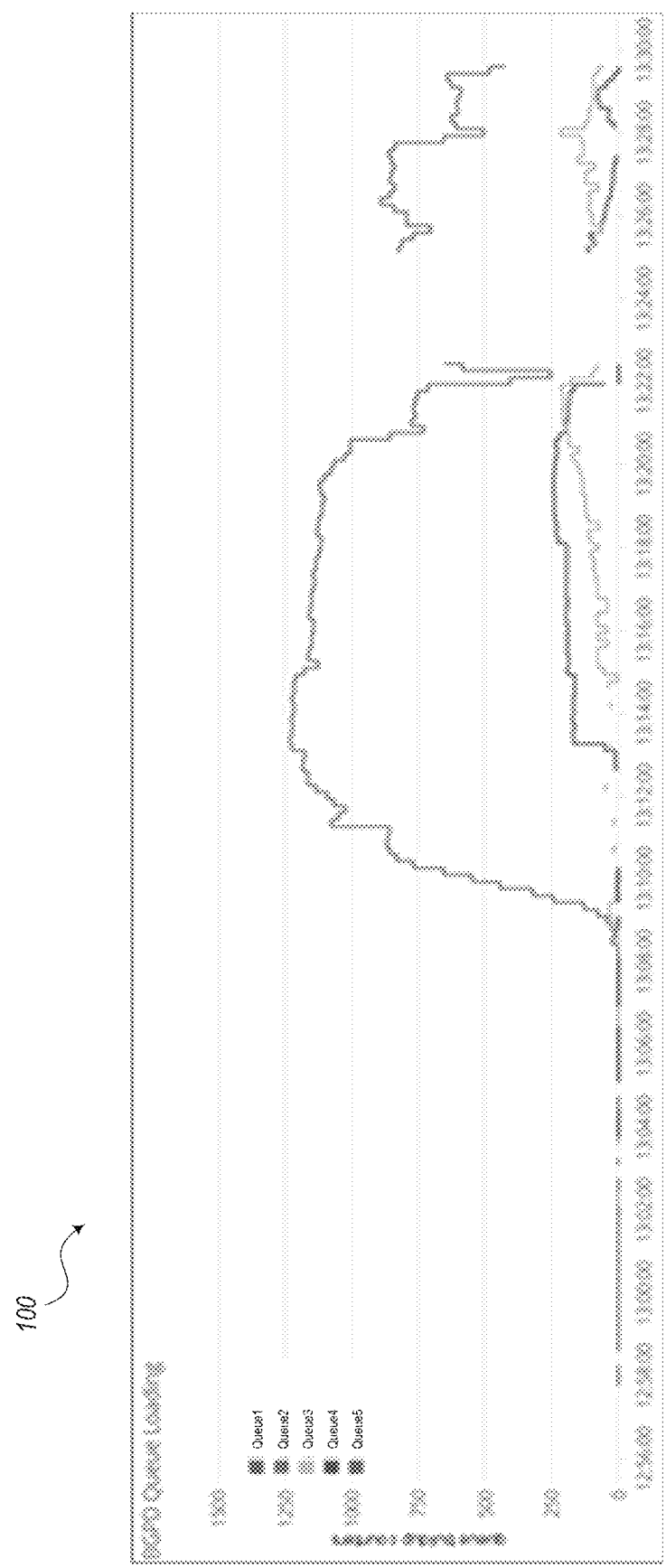
FIGS. 7A-7C are screenshots of dashboards for displaying BGP daemon queue loading, event loading, and Keep Alive transitions in a network element, according to various embodiments.
Figure 7B:
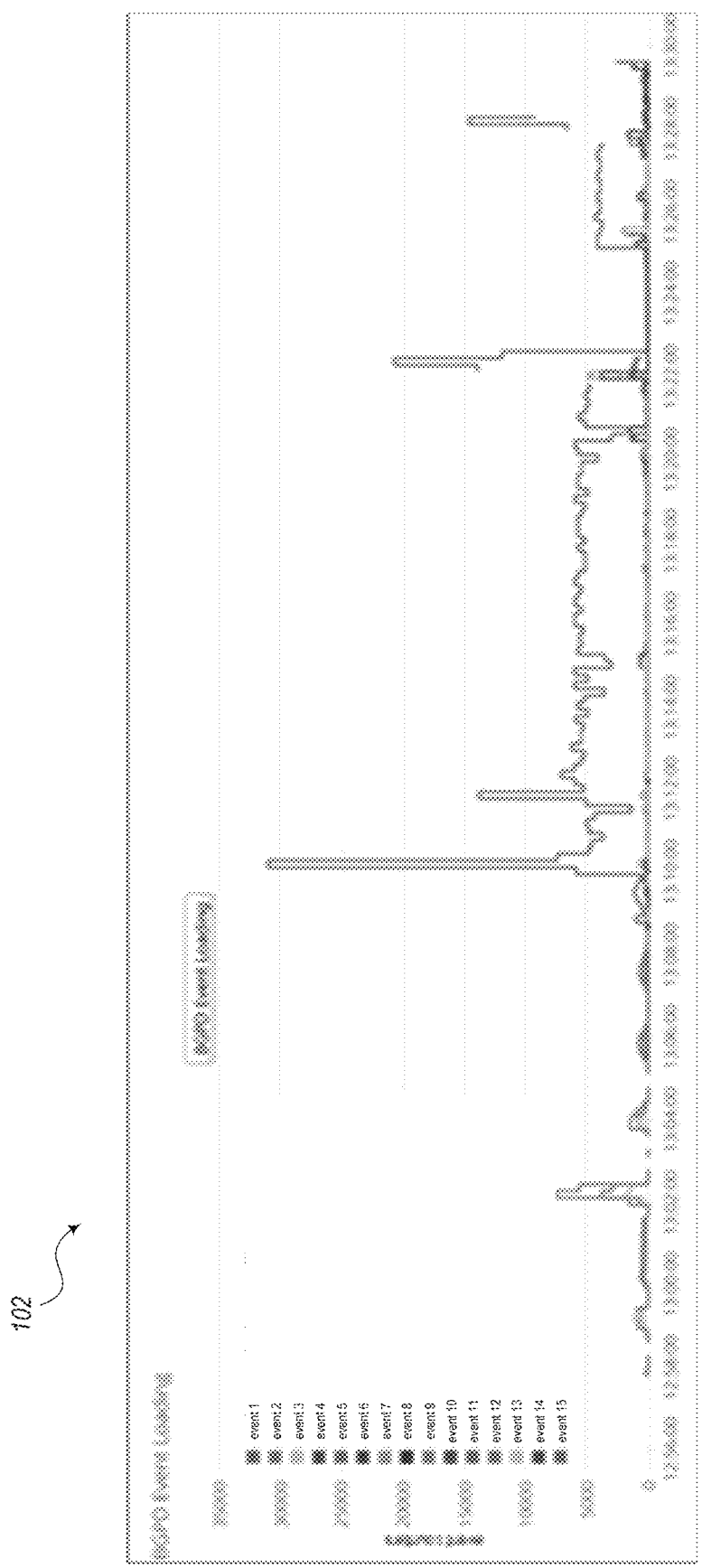
Figure 7C:
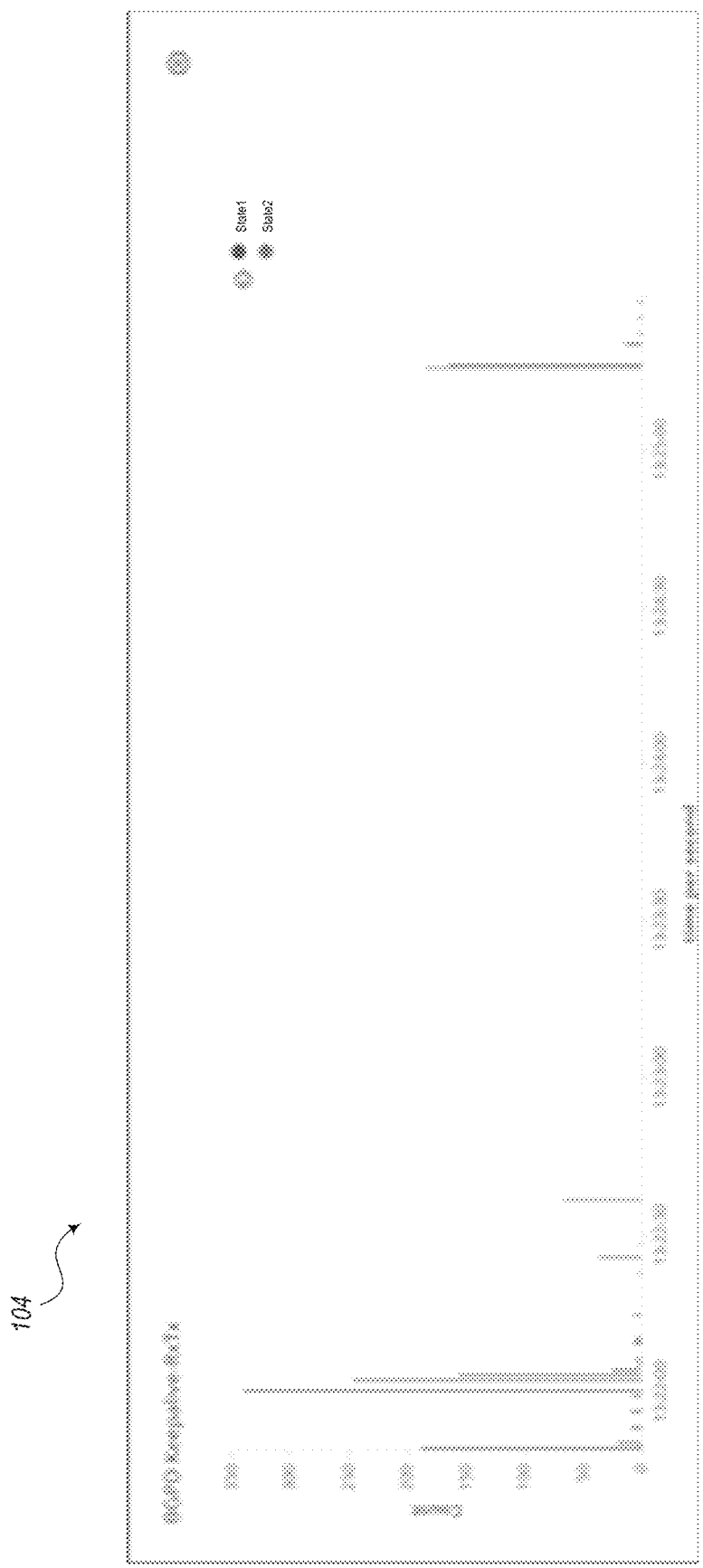

For the above-mentioned parameterizations, the monitoring/tracing unit 34 may be configured to trace the following parameters, which can be pushed in real-time to a filesystem (e.g., memory device 14, database 20, etc.) or a remote monitoring client. The following list includes some parameters of many possible parameters that may be traced:

1. Each BGP FSM transition along with time taken for the same
2. Protocol Queue stats
3. Protocol session stats
4. Protocol Keep Alive stats FIGS. 7A-7C are screenshots of real-time monitoring dashboards 100, 102, 104 for displaying BGP daemon queue loading, event loading, and Keep Alive transitions, respectively, in a network element. As disclosed herein, a BGP Daemon (BGPD) is configured to compute and manage network routing tables or Routing Information Bases (RIBs). The BGPD is configured to exchange information about "network reachability" with its BGP peers. A session engine of the BGPD may be used for maintaining a session with each peer.

Using the data from the dashboards 100, 102, 104 shown in FIGS. 7A-7C may be important for on-box (i.e., within a network element for which scale anomalies are handled) and real-time remedial actions or Software-Defined Networking (SDN) control actions. A few examples are given below.

Based on the above data sources, various filtering or component analysis techniques could be applied to get parameterized information (first-level use-cases), which may include but is not limited to:

1. Dominant Router ID—defined as a BGP neighbor in the network which is either causing a lot of session flaps due to any of its internal issues (either comms/software, etc.) or a BGP neighbor which is repeatedly sending updates to add and withdraw routes at a rapid cadence for prolonged periods indicative of an anomaly from normal behavior. Mechanisms to resolve these conditions could range from dampening a router or de-bouncing multiple routers respectively;
2. Dominant Router prefixes being added/updated/withdrawn more frequently than others. Mechanisms to resolve these conditions could range from triggering prefix discards to route-update backpressure respectively;
3. Dominant FSM transitions with specific routers or varying set of routers. Mechanisms to resolve these conditions could range from triggering router-port isolation to stagger router port adjacency bring-up respectively; and
4. Queueing throughput—indicating pending CPU overload and feedback loops. Mechanisms to resolve these conditions could range from triggering one or all of the above remedial actions.

The system may include an option to advertise these actions in the network and potentially safeguard the network element (e.g., box) from such anomalous behavior. To interop with other vendors, an update message can be created and advertised. An exemplary protocol enhancement is given below:

```
+-----------------------------------------------------------------------+
| UPDATE MSG - TYPE - LEN                                               |
+--------------------+--------------------------------------------------+
| DOMINANT ROUTER ID/ DOMINANT PREFIX                                   |
+-----------------------------------------------------------------------+
| ROUTER ID CLUSTER/ ROUTER PREFIXES CLUSTER                            |
+-----------------------------------------------------------------------+
| ACTIONABLE ATTRIBUTES                                                 |
```

-continued

```
+-----------------------------------------------------------------------+
| ACTIONS LIKE DAMPEN/DE-BOUNCE/DISCARD                                 |
+-----------------------------------------------------------------------+
| DIRECTED ROUTER ID CAUSING ISSUES                                     |
+-----------------------------------------------------------------------+
```

Figure 8A:
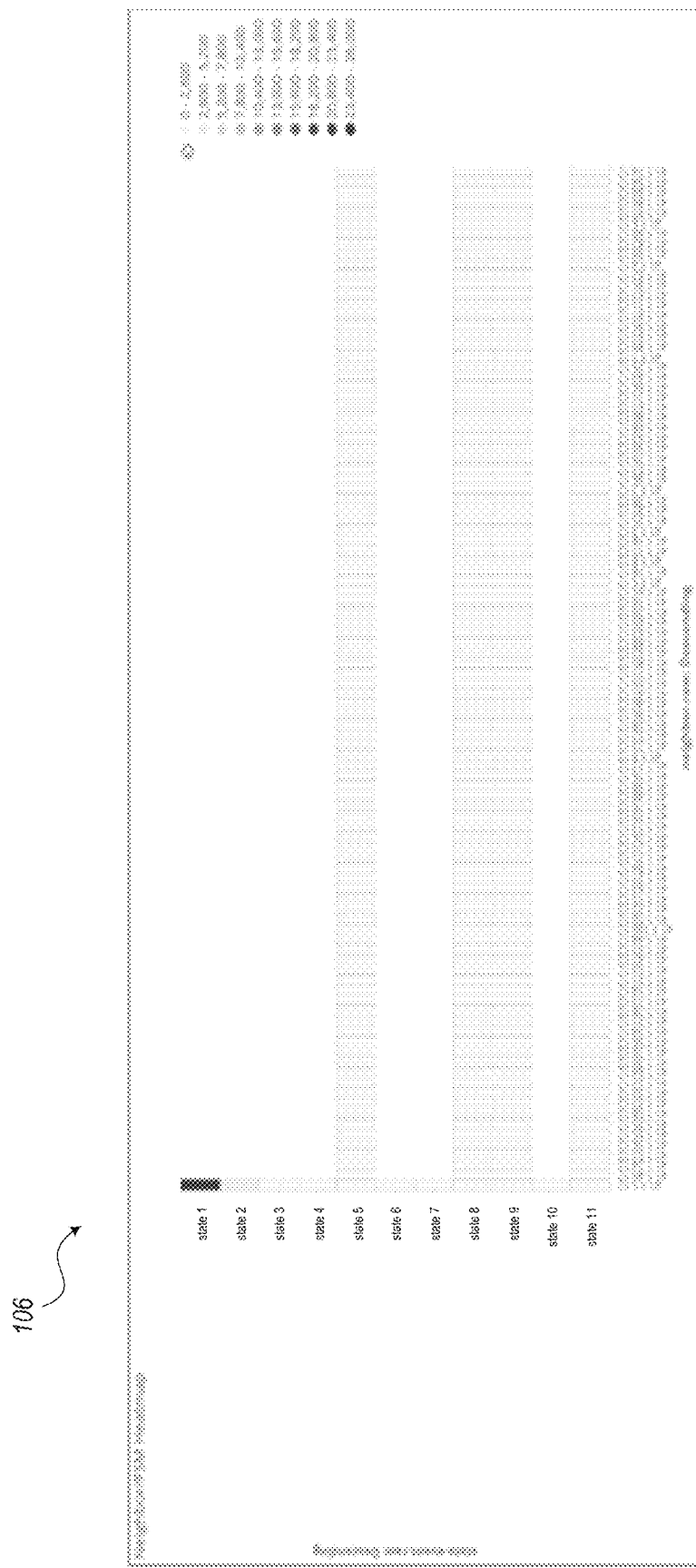
FIGS. 8A-8C are screenshots of dashboards for displaying state transitions of scale anomalies, according to various embodiments.
Figure 8B:
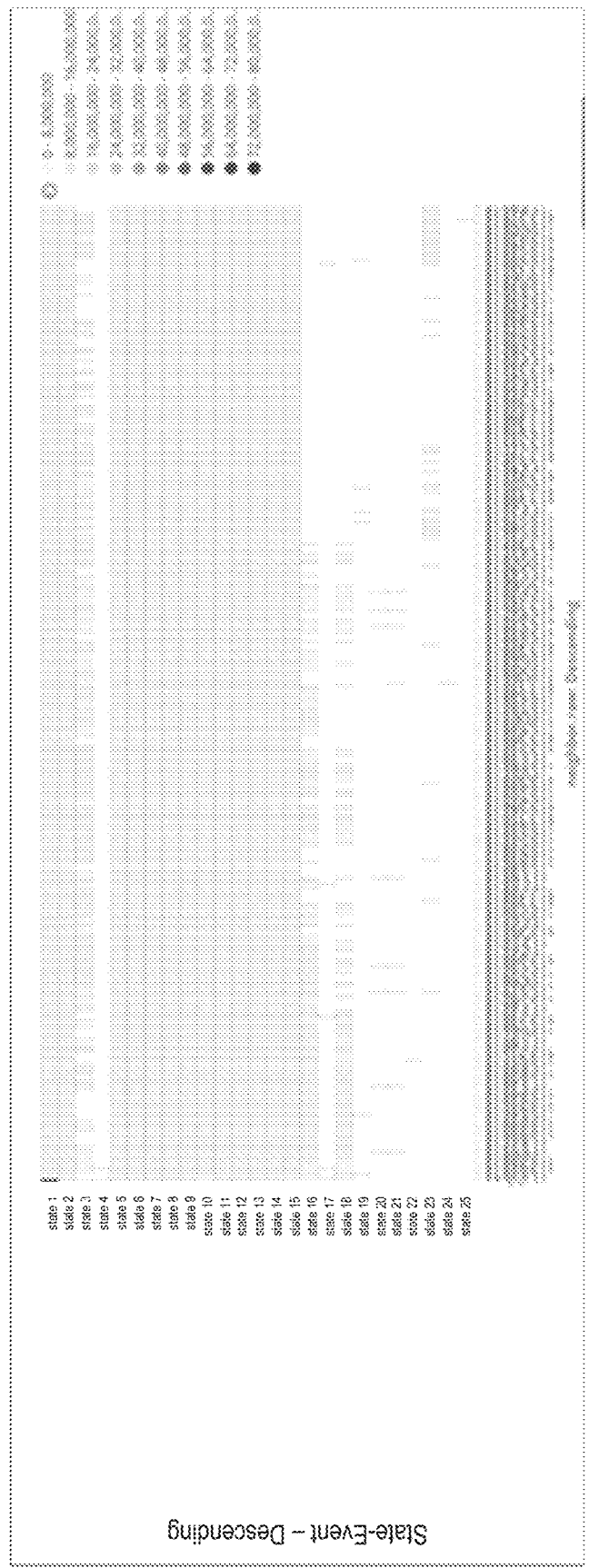
Figure 8C:
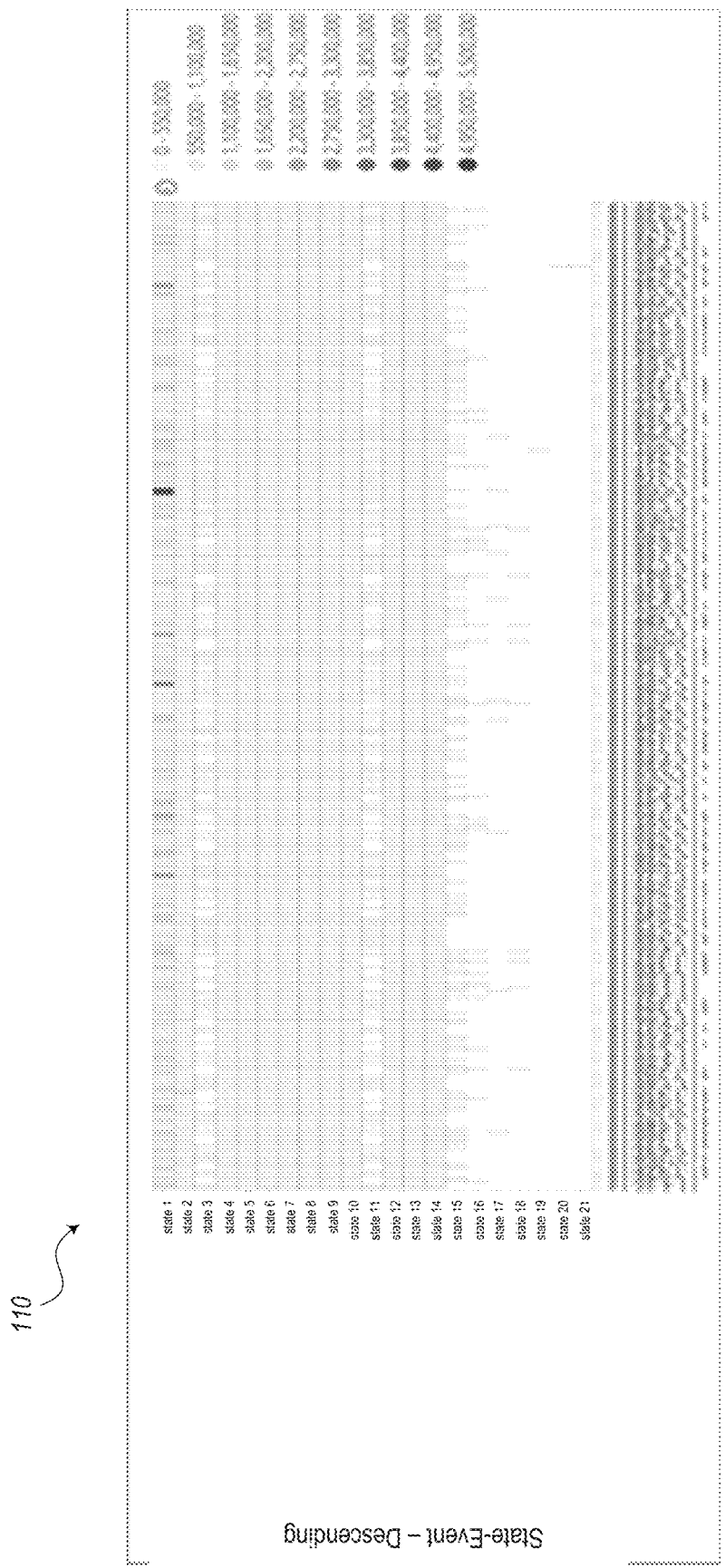

FIGS. 8A-8C are screenshots of dashboards 106, 108, 110 for displaying state transitions of scale anomalies, according to various embodiments. As an example of such detection, the system can isolate a particular router/port of misbehavior and shut it down, as is shown in the dashboard 106 of FIG. 8A. According to another example of such detection, the system can isolate routers to trigger remedial scale-actions like debouncing, back-pressure or dampening, as is shown in the dashboard 108 of FIG. 8B. As another example of such detection, the system can isolate routers and specific route-prefixes to trigger remedial scale-actions like debouncing, back-pressure or dampening for a subset of routers and associated advertised prefixes, as is shown in the dashboard 110 of FIG. 8C.

According to a data gathering process (e.g., obtaining from a data source via tracing), a common tracing framework in the industry is Linux Trace Toolkit—Next Generation (LTTNG), which is core-based and may be integrated into the present system. However, another framework may be incorporated in the present system, which may be implemented as a bare-metal thread-based tracing framework with very low footprint and may even be used with modem solutions having RAM limits on the order of 32 MB. Therefore, the embodiments of the present disclosure may include a number of features that may be distinguished from conventional systems, as described below.

Define a Scale-Anomaly Detection Framework

For instance, one advantage of the present systems is the ability to define a scale anomaly detection framework. The present disclosure ventures into an L3 router scale configuration, and thus the embodiments herein are configured to build a framework for scaling the BGP protocol. In the process of achieving scale, the present embodiments define and build a scale anomaly detection framework. Currently, conventional systems do not perform scale anomaly detection/parameterization, real-time feedback, and remedial actions. Conventional systems may typically include feature sets for scale which are based on configurations like peer-groups, etc. However, according to the present disclosure, the systems and methods described herein are configured to support scale irrespective of configuration and enable a network system to self-adapt with scale.

BGP Data Labelling and Parameterization for Scale Anomaly Detection

The systems and methods of the present disclosure are also configured to perform BGP data labelling and parameterization for scale anomaly detection. The details for this feature are described above with respect to FIGS. 1-6.

For example, the process of "data labelling" may refer to a routing protocol where the data that is mined for evaluation needs to be labelled appropriately. An example could range from BGP standard defined FSM transitions to implementation specific DB/network/code-trace events. The process of "parameterization" may refer to what statistical measurements are made to each of the labelled data which are useful in detection of anomalous behavior or behavioral clustering of routers or router prefixes. A few of the parameters may be relevant as an average measure, where others may need to be correlated as time-series data or evaluated as probabilistic distributions. The processes of "data labelling" and "parameterization" may enable a machine learning infrastructure for unsupervised/supervised clustering/learning for BGP networks.

Define Parameterized Data Sources and Dominant Factorization/Correlation Analysis The embodiments of the present disclosure are further configured to perform the process of defining parameterized data sources. Also, the present embodiments are also configured to perform dominant factorization/correlation analysis. Remedial techniques and accompanied real-time triggers may, according to some embodiments, include known techniques. However, the parameterized data sources mentioned in the present disclosure and their dominant factorization/correlation analysis are aspects that are not performed by other systems in the industry.

Once the parameterized data sources are defined and information of the dominant factorization/correlation is detected or obtained by one node or network element, this information can then be advertised across the network. Such a collaborative network action can lead to a faster convergence.

Without tracing, this can be open to telemetry. Detection can be performed offline as well in the case where a telemetry mechanism is incorporated in the system to push data out of the network element (e.g., box). This may not necessarily be dependent on an on-box (i.e., within the network element) framework. Telemetry would just be add-ons.

Figure 9:
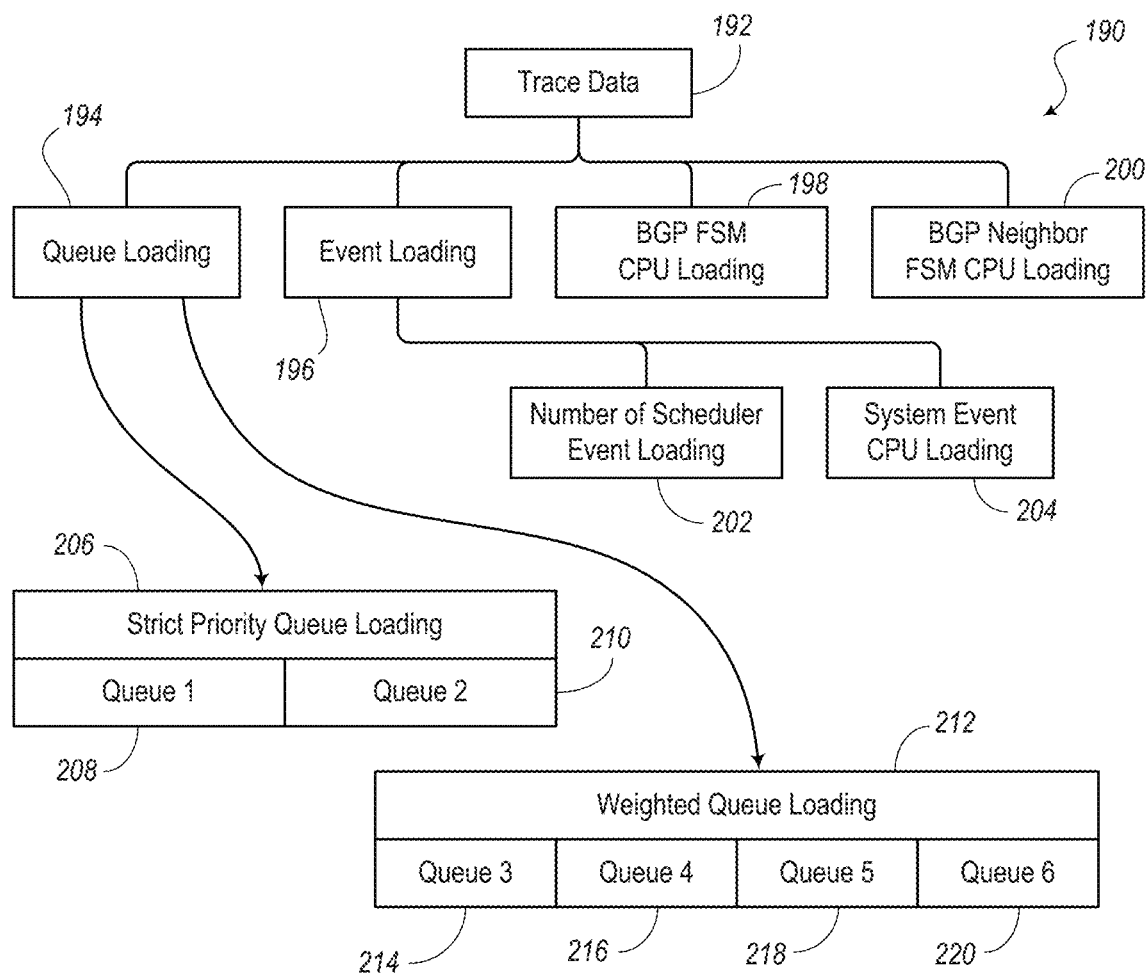
FIG. 9 is a diagram illustrating BGP characterization metrics for parameterizing variable of scale anomalies, according to various embodiments.

FIG. 9 is a diagram illustrating BGP characterization metrics 190 for parameterizing variables of scale anomalies, according to various embodiments. BGP characterization metrics 190 include the metrics collected for characterization. Trace data 192 includes queue loading 194, event loading 196, BGP FSM CPU loading 198, and BGP neighbor FSM CPU loading 200. Event loading 196 includes a number of scheduler event loading 202 and a system event CPU loading 204. The queue loading 194 includes a strict priority queue loading 206 and weighted queue loading 212.

Queue loading 194 indicates schedulers events/timers, etc. queueing metrics based on the scheduling behavior. Events loading 196 may be configured to be bifurcated into the counts of events 202 and CPU utilization per event 204. The BGP FSM CPU loading 198 may be the CPU utilization per FSM transition. the BGP Neighbor FSM CPU loading 200 may be the CPU utilization per FSM transition per FSM (e.g., heatmap).

Figure 10A:
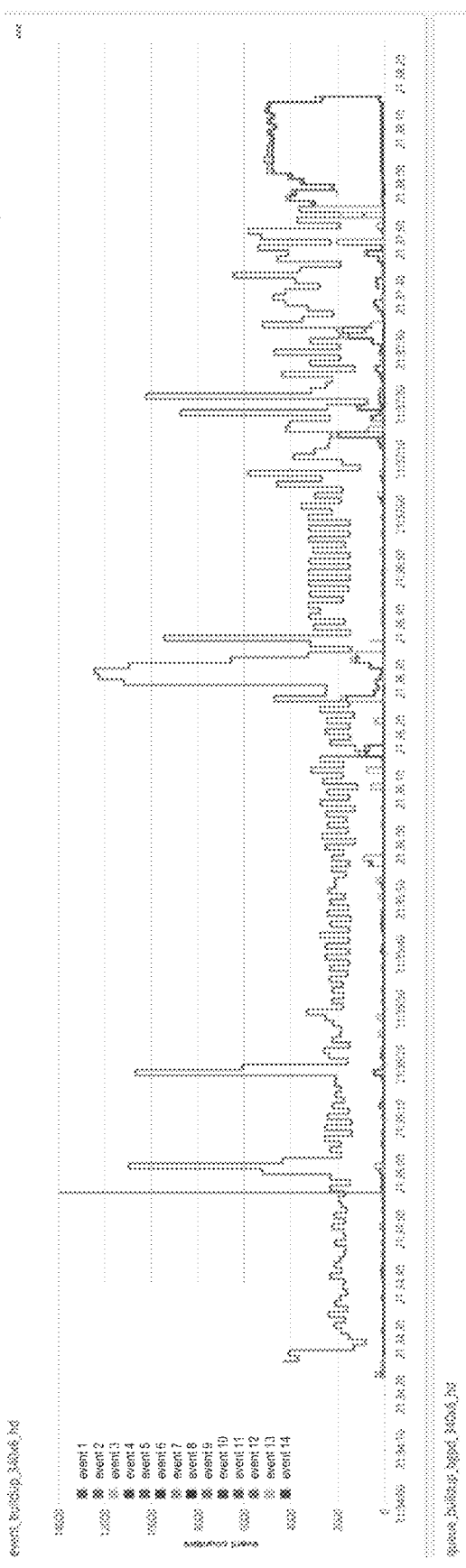
FIGS. 10A-10D are screenshots of dashboards for displaying different features of events and sessions, according to various embodiments.
Figure 10B:
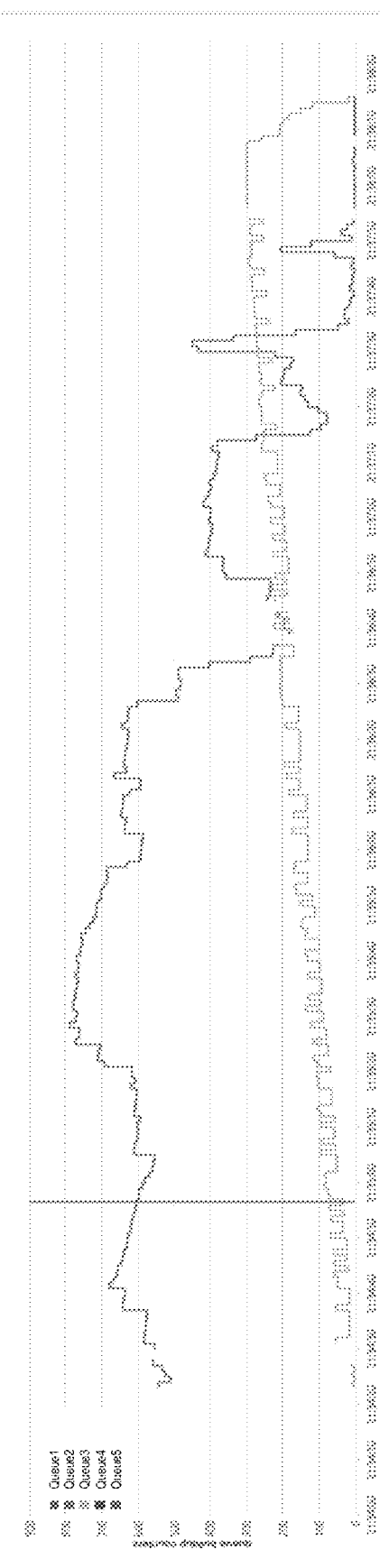
Figure 10C:
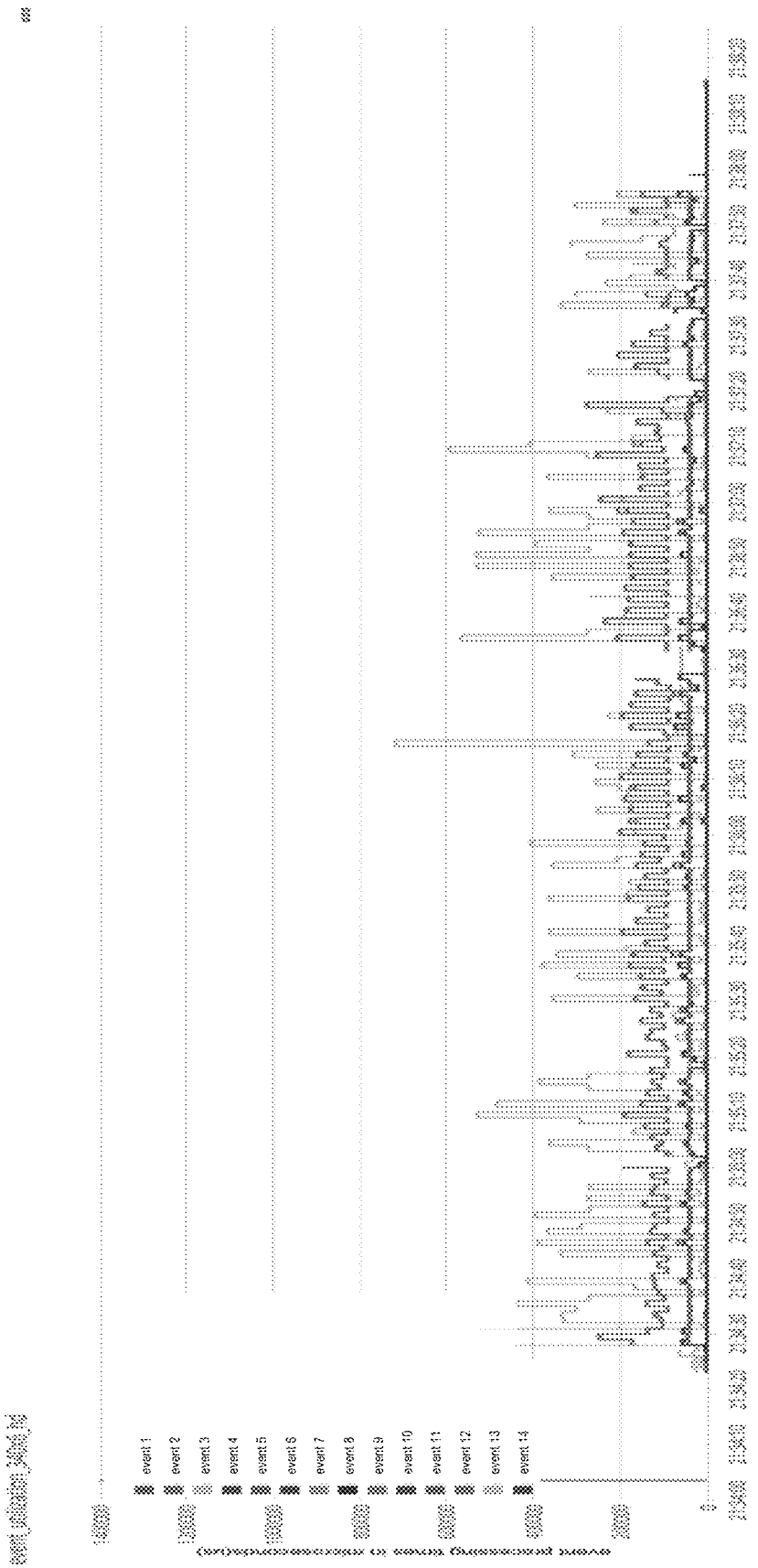
Figure 10D:
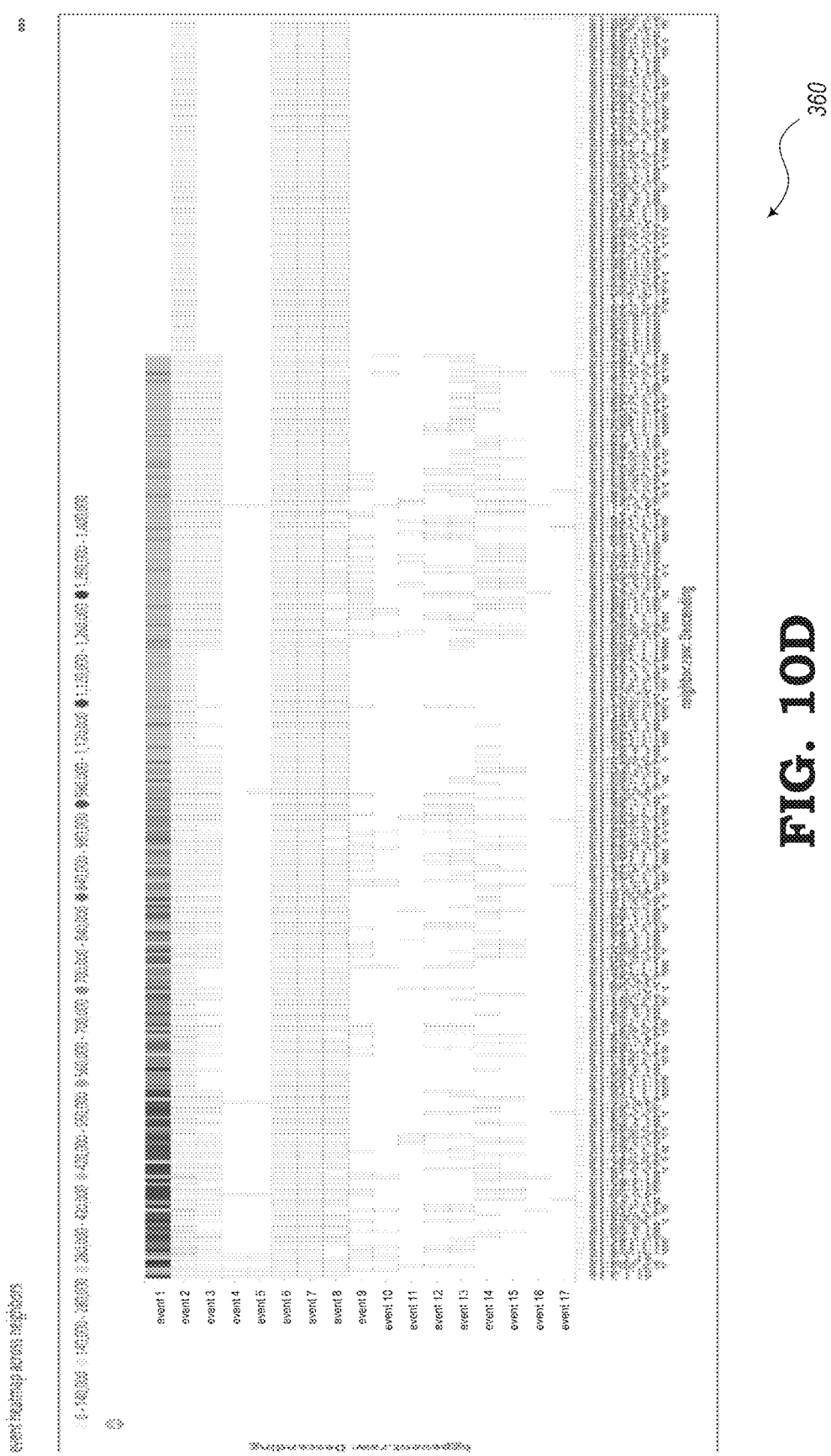

FIGS. 10A-10D are screenshots of dashboards 330, 340, 350, 360 for displaying different features of events and sessions. The dashboard 330 of FIG. 10A shows the event buildup with a 340×6 configuration in one example. The dashboard 340 of FIG. 10B shows the queue buildup of the BGP daemon process with the 340×6 configuration in one example. The dashboard 350 of FIG. 10C shows the event utilization with the 340×6 configuration in one example. Also, the dashboard 360 of FIG. 10D shows the event heatmap across neighbors in one example. These examples may be configured to represent phase one for a parallelism process for 2× only.

The present disclosure may also have advantages over prior systems in that there may now be resolution of BGP design issues. Several complex issues are solved using the techniques of the present disclosure. As a result, it is possible to achieve improved Layer 1 Route Reflector convergence time by about 90%. It is also possible to achieve improved Layer 2 Route Reflector convergence time by about 88%.

Another benefit is that the embodiments of the present disclosure may be configured to resolve anomalies with NMS integration. The systems and methods are configured to resolve BGP anomalies. Data labelled traces can be disabled or enabled on demand. Furthermore, due to its very low latency design, it can be left over on in-service field equipment. When issues occur, the anomalies can be debugged in real time, providing robust issue detection framework for the service provider.

Also, the present embodiments may be able to provide real time labelled data source to NMS. A data source may consist of real time labelled traces generated by a multi-core, low-latency framework. Labelled traces may be used to distinguish different events, state changes, and transitions. The static analysis may be performed on this data sets to detect BGP anomalies.

Thus, the present disclosure generally relates to the Layer 3 routing domain, such as a network element (or box) on the optical layer, and to Layer 2 switching. The scale software may be utilized in terms of the routing domain in order to leverage the density. Instead of a typical two distinct-box solution, the present disclosure may be configured as a single network element (e.g., one network element in a rack or scalable to multiple racks) solution, which may be configured to provide optical to layer 3 functions including router functions in the single network element. The single network element may be configured in any way according to a customer's needs.

However, in this realm in which a system is integrated in one box, there is typically a problem when it comes to scaling. As a result of scaling, such a system may lead to black hole routing, loops, endless updates, etc. The software, when scaled to such a large scale, may lead to the same situations as a system with these routing/looping/updating problems. For example, the FSM and the BGP protocol are typically fragile with respect to timers, which can lead to these problems. At scale, a network element may attempt to instantiate more than 300-500 FSMs and then load the system. However, those FSMs may start to compete with each other. This is one way that the scale-related anomalies start.

Although anomalies are to be expected in a system, the embodiments of the present disclosure are configured to fix these problems. The first step is detecting the scale anomalies at several ports where the router processing is taking too long. The present embodiments are configured to parameterize the protocol events in the single network element (internally on the box) with respect to FSM transitions. The next thing is to characterize the queueing throughput of the FSMs. Then, the repeated neighbor updates are detected.

The system also uses correlation logic with respect to IP addresses. A third detection is re-announcement, which is related to correlation. Each link flap may lead to a restart of the FSM, which requires restarting the cycle again.

There are also session flaps. This is related to frequency transforms, where trends can be observed. The heartbeats are driven in some sections during some durations. The system performs a type of analysis in the frequency domain of heartbeats. The system may be able to see this vertical anomaly in the session flap.

All these scale anomalies may lead into a feedback loop, which causes the system or BGP to behave in a non-linear fashion. If the software cannot scale the system to this extent, the system gets into a feedback loop. The next part of the process of attacking the problem once the anomalies are detected includes allowing the embodiments of the present disclosure to detect the feedback loops. After detecting them, the system needs to know how to fix them or advertise them in the network.

The software (e.g., BGP enhancement module 24) of the present disclosure may be designed or built in a way that these positive feedback loops never happen. Nonetheless, if they do happen, the system is configured to detect them and take remedial action. The detection mechanics is therefore able to work on any scale. The process may involve parameterization in terms of statistics. Once detection is achieved, then the behavior of the network element may be detected and then action can be taken. In some embodiments, there may be four types of anomalies, such as those discussed above and four first level use-cases which can be detected.

A dominant router ID may cause issues on a cluster of router IDs if there are restarts or link flaps related to a certain cluster of routers behind a dominant router. One way to detect this behavior is that once a dominant router ID is detected, a cluster of router IDs behind the dominant router ID can be analyzed. The embodiments of the present disclosure may then dampen the updates from that router and start safeguarding the network element.

In another example, if the network element is in transitions with respect to specific routers, the responsibility might not be link flaps, but it could be something else. At this point, the embodiments may include detecting the dominant FSM transitions which are happening. Once these are figured out, the systems may then delay the FSM transitions or take other actions (e.g., staggering FSM transitions) so that the network element is not impacted too severely by that particular router ID.

These are a few examples which, once detected, irrespective of scale, positive feedback loops can be broken over time. Once these feedback loops are broken, the software described in the present disclosure may allow the system to be scaled to any size or number of ports.

A "dominant router ID" may mean that two parts are changing router IDs in a BGP domain and could be an identity attached to a router, which may be sending updates and may include link flaps. This router could also be a router reflector as well. There could be a cluster of BGP routers behind that router which are hidden and not directly connected to a port of the network element. Thus, this whole cluster, because it is hidden behind that router, in a way, may show the same behavior as the dominant router in terms of updates and traffic processing. That can mean it is not just one router that the system needs to dampen in terms of update processing, but it may also be one router hiding a sub-network behind it.

A BGP session may be just one peer (i.e., the dominant router). In BGP, the system may not be set up as a complete mesh, since a network operator may not want a KN graph. Thus, the network operator may configure certain routers as route reflectors, which will hide the sub-network and the network element is only connected to the route reflector. The RR will reflect everything behind itself. Thus, the cluster could be a whole sub-network, which may be route-reflected. Because of an exponential scale, making KN in BGP may be too much for the system to handle.

Detection may therefore be a key strategy in the present disclosure. The anomalies may be detected use the techniques described herein. As shown in the second and third columns of FIG. 5, detection is usually followed by various methods (e.g., described with respect to the various flowcharts of the present disclosure). There may be anomaly detection in the Machine Learning (ML) space, which may be a transition for network designers. To solve the anomalies, the systems of the present disclosure are configured to parameterize certain data by determining first which dimensions need to be analyzed when anomalies occur. This may be the number of sessions, the number of routes and prefixes, the number of services on top of specific routes, and/or other conditions or states.

When dimensions are analyzed, the second column of FIG. 5 (e.g., filtering/tracing techniques), the system is configured to capture data for these dimensions using software (e.g., the BGP enhancement module 24). The second column provides information in terms of the dimensions that the system is trying to scale. This may include the number of nodes in a network, number of sessions, number of nodes, number of prefixes and routes, etc. These parameters give indication of that.

There may not be a dedicated link or one-to-one mapping in this case, but a network operator would understand how to read this and extract specific information about each dimension from the true values. This is the parameterization that is performed by the present systems and methods. It is possible to get information about dimensions that the network operator may want the network to scale to. The systems try to scale the number of sessions as the number of routes and prefixes as well as the number of services on top of each of these routes and prefixes. Thus, there may be three dimensions to scale the system. How information is obtained may be based on these tracing techniques. Once this information is obtained, the system may have issues scaling the three dimensions. The systems may be configured to plot across three dimensions. This is where the correlation and analytical approach of frequency transform or correlation clustering comes into play. Once all this data is obtained, the systems of the present disclosure may be configured to start plotting in three dimensions, such as by applying a technique called transferring or correlation.

It may take those data points to determine how the system is behaving. It can behave mostly on this dimension with a low number of neighbors, but with a high volume of route processing. Based on that, the system can detect one kind of behavior. The system can also detect the reverse behavior. The system takes the data points from the second column of FIG. 5 and is configured to analyze this to understand the dimensions for scaling the system.

The dashboards 100, 102, 104 of FIGS. 7A-7C show, over time, the detected statistics of the network, but these are just numbers. In FIG. 7A, there is shown a three-minute gap where there is no heartbeat of the system. By doing frequency transform of the heartbeat statistics of all the sessions, it can be determined that this condition is related to all the sessions and not just a single neighbor. Of course, this is an anomaly that should not be overlooked.

There may be a trend in this data and the moment that there is a loss in this trend, the systems and methods of the present disclosure are configured to detect this loss right away, which may be related to the data from FIG. 7C. With all this data, the system goes about performing filtering and tracking (as shown in column two of FIG. 5). The third row in FIG. 5 is related to the frequency transform, which is represented by the data in FIG. 7C. In a sense, this may be viewed as an EKG of the network, showing the heartbeat of the network for a certain duration.

Regarding FIGS. 8A and 8B, this is where the "correlation" comes in. The y-axis is these dashboards 106, 108 represent each FSM transition and the x-axis represents every vertical neighbor, which advertises that the network element is experiencing these transitions. If there is a session flap with one vertical neighbor, then the system can detect the direct spot from the data collected earlier. The present systems can plot these correlation heat maps (e.g., related to column three of FIG. 5), which may be the analytical clustering approach. This map may be derived from the data that is plotted across two dimensions, as an example. The systems and methods can also cross three dimensions as well, which affects the number of sessions.

The dark spots in FIGS. 8A-8C represent an undesirable condition. The spots below the dark spots are also undesirable in the system. Time duration for certain FSM transitions (e.g., marked as the dark spots in FIGS. 8A and 8B) indicated that this transition should not be happening and is considered to be an anomaly in the system based on scale. This is something that the systems and methods of the present disclosure are configured to detect as part of this exercise.

By incorporating the various embodiments of the systems and methods of the present disclosure into a network or network element, a network operator may be able to run the network without needing to worry about scale, since the present disclosure allows the system to self-adapt based on scale. It would therefore be desirable to allow a customer (e.g., network operator) to scale a network without the need to reconfigure this network in a way that may normally be needed to get rid of various types of scale problems. Thus, the present disclosure is able to detect and adapt to this case problem, rather than ask customers to re-configure their own networks. This is one reason why detection may be important. Most of these solutions can be addressed internally as one thing in the node. The interaction with neighbors may be an optional advertisement or information sharing process.

Based on data, the embodiments herein can create a packet or PDU and send it to a peer, which can then recognize that the initial device detected that something is wrong with a router or cluster. At this point, the peer too can take actions (e.g., staggering delays) if it gets FSM transitions from the initial device. The peer can take other actions as well, since there may be a delay in convergence because of activity at a fault. In this case, the systems and methods may not solicit solutions from a peer but may simply suggest that there is some action being taken to avoid issues of anomalies at scale.

With any detection, the systems of the present disclosure may determine what are the optimum parameters needed to which the solution can be applied. The systems may take a certain parameter (e.g., router ID), determine how often a certain condition may be allowed to happen, etc. These are parameters may usually be hard to come up with very fast, but some of the first values may be obtained offline across the network as well as because of a global knowledge of the network. The present systems could do all these calculations offline and then push them onto the network element (e.g., box) as configuration parameters. Then, if the network element starts behaving in a certain way, the system may react in terms of remedial actions. Based on the local information, the system may come up with certain values and stagger them.

There may be a few different methods (e.g., information staggering, optimal maximum staggering, linear staggering, linear dampening up to maximum, or other methods) tj at could be learned offline, but there may be a delay loop with that. The longer it is with a global controller, a central controller may be used. Such a central controller may be beneficial in some cases because it will have a global view and may be capable of more useful responses in terms of remedial actions within the network. There may be a delay in this case. The system, therefore, may also be configured to determine that the delay would not be long enough to put the system into a non-linear state. This could be implemented locally or remotely (globally). What can be done, therefore, is to redesign the network sensitivities to cater to such nodes. It is unconventional in this field to implement the types of functions described in the present disclosure, especially since it is typically not known how to configure in-skin mechanisms (e.g., mechanisms in the network element, router, switch, etc., itself), because the space with the network element. In some embodiments, this could be a hybrid approach of local and global elements such that interacting can be performed with neighbors through some advertisement.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer readable medium comprising instructions that, when executed, cause a network element to perform the steps of:
   maintaining and tracking states of multiple Border Gateway Protocol (BGP) peers and routes while operating BGP within one or more Autonomous Systems;
   detecting one or more anomalies of a plurality of anomalies, based on the maintaining and tracking, as a number of any of the multiple BGP peers and routes scale in the one or more Autonomous Systems; and
   causing processing of one or more remedial actions that is one of a plurality of remedial actions that are selected based on the one or more detected anomalies for alleviation thereof.

2. The non-transitory computer readable medium of claim 1, wherein the one or more anomalies are network issues directly related to scaling the one or more Autonomous Systems beyond a scale threshold.

3. The non-transitory computer readable medium of claim 2, wherein the one or more anomalies beyond the scale threshold result in positive feedback loops further leading to convergence issues.

4. The non-transitory computer readable medium of claim 1, wherein the plurality of remedial actions include any of clustering a number of peers that can be represented by a dominant peer, de-bouncing, discarding, backpressure, and dampening a subset of network elements within the one or more Autonomous Systems.

5. The non-transitory computer readable medium of claim 1, wherein the instructions, when executed, further cause the network element to perform the step of tracing behavior to find a root cause of an anomaly based on scaling the one or more Autonomous Systems.

6. The non-transitory computer readable medium of claim 1, wherein the instructions, when executed, further cause the network element to perform the step of
   data labelling and parameterization to identify the one or more anomalies based on a scale of the one or more Autonomous Systems.

7. The non-transitory computer readable medium of claim 6, wherein the plurality of anomalies include any of prolonged route update processing, repeated neighbor route update processing, re-announcement of BGP neighbor processing, and BGP neighbor session flap processing.

8. The non-transitory computer readable medium of claim 6, wherein the instructions, when executed, further cause the network element to perform the step of
filtering or tracing the network element to detect information characterized by the data labelling and parameterization.

9. The non-transitory computer readable medium of claim 8, wherein the detected information includes at least one of event queue statistics, BGP neighbor FSM transitions, and Keep-Alive statistics.

10. The non-transitory computer readable medium of claim 1, wherein the instructions, when executed, further cause the network element to perform the steps of
receiving feedback from a Software Defined Networking (SDN) device or Networking Monitoring System (NMS) that monitor parameters to enable the network element to self-adapt based on the scale of the one or more Autonomous Systems and the multiple BGP peers.

11. The non-transitory computer readable medium of claim 1, wherein the number of the multiple BGP peers is greater than about 500 for a large scale and the number of the multiple BGP peers is less than about 100 for a small scale.

12. The non-transitory computer readable medium of claim 1, wherein the number of routes is greater than about 500 k for a large scale and the number of routes is less than about 16 k for a small scale.

13. The non-transitory computer readable medium of claim 1, wherein the states are maintained by a Finite State Machine (FSM) that includes a plurality of states.

14. A network element having ports and circuitry configured to
maintain and track states of multiple Border Gateway Protocol (BGP) peers and routes while operating BGP over one or more of the ports within one or more Autonomous Systems,
detect one or more anomalies of a plurality of anomalies, based on the maintaining and tracking, as a number of any of the multiple BGP peers and routes scale in the one or more Autonomous Systems, and
cause processing of one or more remedial actions that is one of a plurality of remedial actions that are selected based on the one or more detected anomalies for alleviation thereof.

15. The network element of claim 14, wherein the one or more anomalies are network issues directly related to scaling the one or more Autonomous Systems beyond a scale threshold.

16. The network element of claim 14, wherein the network element provides optical to layer 3 functions including router functions.

17. The network element of claim 14, wherein the number of the multiple BGP peers is greater than about 500 for a large scale and the number of the multiple BGP peers is less than about 100 for a small scale, and
wherein the number of routes is greater than about 500 k for the large scale and the number of routes is less than about 16 k for the small scale.

18. The network element of claim 14, wherein the one or more anomalies beyond the scale threshold result in positive feedback loops or convergence issues, and wherein the plurality of remedial actions include any of clustering a number of peers that can be represented by a dominant peer, de-bouncing, discarding, backpressure, and dampening a subset of network elements within the one or more Autonomous Systems.

19. A method comprising:
maintaining and tracking states of multiple Border Gateway Protocol (BGP) peers and routes while operating BGP within one or more Autonomous Systems,
detecting one or more anomalies of a plurality of anomalies, based on the maintaining and tracking, as a number of any of the multiple BGP peers and routes scale in the one or more Autonomous Systems, and
cause processing of one or more remedial actions that is one of a plurality of remedial actions that are selected based on the one or more detected anomalies for alleviation thereof.

20. The method of claim 19, wherein the plurality of remedial actions include any of clustering a number of peers that can be represented by a dominant peer, de-bouncing, discarding, backpressure, and dampening a subset of network elements within the one or more Autonomous Systems.

* * * * *